(12) United States Patent
Kashima

(10) Patent No.: US 6,862,073 B2
(45) Date of Patent: Mar. 1, 2005

(54) CIRCULARLY-POLARIZED-LIGHT EXTRACTING OPTICAL ELEMENT AND PROCESS OF PRODUCING THE SAME

(75) Inventor: Keiji Kashima, Shinjuku-ku (JP)

(73) Assignee: Dai Nippon Printing Co., Ltd. (JP)

( * ) Notice: Subject to any disclaimer, the term of this patent is extended or adjusted under 35 U.S.C. 154(b) by 153 days.

(21) Appl. No.: 10/203,794

(22) PCT Filed: Dec. 20, 2001

(86) PCT No.: PCT/JP01/11208

§ 371 (c)(1),
(2), (4) Date: Aug. 14, 2002

(87) PCT Pub. No.: WO02/50581

PCT Pub. Date: Jun. 27, 2002

(65) Prior Publication Data

US 2003/0090618 A1 May 15, 2003

(30) Foreign Application Priority Data

Dec. 20, 2000 (JP) .................................. 2000-387682
Mar. 5, 2001 (JP) .................................. 2001-60392

(51) Int. Cl.⁷ .................................................. G02F 1/13
(52) U.S. Cl. ..................................................... 349/194
(58) Field of Search ................................. 349/194, 175, 349/185–187, 98

(56) References Cited

U.S. PATENT DOCUMENTS

| 5,999,243 | A | * | 12/1999 | Kameyama et al. | ........ 349/185 |
| 6,133,980 | A | * | 10/2000 | Faris | ............................. 349/176 |
| 6,160,597 | A | * | 12/2000 | Schadt et al. | .................. 349/98 |
| 6,171,518 | B1 | * | 1/2001 | Hikmet et al. | ......... 252/299.01 |
| 6,266,113 | B1 | * | 7/2001 | Yamazaki et al. | .......... 349/115 |
| 6,433,853 | B1 | * | 8/2002 | Kameyama et al. | ........ 349/176 |
| 6,636,291 | B2 | * | 10/2003 | Van De Witte et al. | .... 349/187 |
| 6,661,482 | B2 | * | 12/2003 | Hara | ........................... 349/96 |
| 6,667,788 | B1 | * | 12/2003 | Maruyama et al. | ......... 349/115 |
| 6,693,686 | B2 | * | 2/2004 | Umeya | ........................ 349/98 |

FOREIGN PATENT DOCUMENTS

| EP | 0 834 754 A1 | 4/1998 |
| EP | 1 046 934 A1 | 10/2000 |
| JP | 57-165480 | 10/1982 |
| JP | 4-016928 | 1/1992 |
| JP | 7-258638 | 10/1995 |
| JP | 8-271731 | 10/1996 |
| JP | 9-304770 | 11/1997 |
| JP | 10-508882 | 9/1998 |
| JP | 0 881 510 A2 | 12/1998 |
| JP | 11-44816 | 2/1999 |
| JP | 11-153712 | 6/1999 |
| JP | 11-160539 | 6/1999 |
| JP | 11-202302 | 7/1999 |
| JP | 11-264907 | 9/1999 |
| JP | 11-293252 | 10/1999 |
| JP | 2000-321408 | 11/2000 |

* cited by examiner

Primary Examiner—Thien M. Le
Assistant Examiner—Edwyn Labaze
(74) Attorney, Agent, or Firm—Parkhurst & Wendel, L.L.P.

(57) ABSTRACT

Provided is a circularly-polarized-light-extracting optical element adapted to effectively prevent lowering of displaying quality that is brought about by the appearance of bright and dark stripes on the screen of a display even when the circularly-polarized-light-extracting optical element is placed between circular or elliptical polarizers arranged in the cross nicol disposition. The circularly-polarized-light-extracting optical element 10 includes a liquid crystal layer 12 having cholesteric regularity with liquid crystalline molecules in planar orientation. The liquid crystalline molecules on a surface 12A, which is one of the two main opposite surfaces 12A and 12B of the liquid crystal layer 12, are wholly oriented in substantially one direction (director Da) and the liquid crystalline molecules on the other main surface 12B of the liquid crystal layer 12 are also wholly oriented in substantially one direction (director Db). In the case where the liquid crystal layer 12 is made of a plurality of liquid crystal layers, it is preferable that the directors in planes in the vicinity of the interface of each two neighboring liquid crystal layers be substantially parallel to each other.

27 Claims, 14 Drawing Sheets

CIRCULARLY-POLARIZED-LIGHT EXTRACTING OPTICAL ELEMENT AND PROCESS OF PRODUCING THE SAME

TECHNICAL FIELD

The present invention relates to a circularly-polarized-light-extracting optical element for use in the extraction of circularly polarized light from non-polarized light by making use of a liquid crystal layer having cholesteric regularity, to a process of producing such a circularly-polarized-light-extracting optical element, and to a polarized light source device and a liquid crystal display using such a circularly-polarized-light-extracting optical element. The term "liquid crystal layer" as used in this specification means a layer having the properties of liquid crystals in an optical sense; and, from the viewpoint of the state of the layer, the "liquid crystal layer" includes a layer in the state of fluid liquid crystalline phase, as well as a layer in the state solidified with the molecular orientation characteristic of a liquid crystalline phase maintained.

BACKGROUND ART

A circularly-polarized-light-extracting optical element that is made to reflect either right- or left-handed circularly polarized component having a wavelength equal to the helical pitch of liquid crystalline molecules in a cholesteric liquid crystal layer and to transmit the other circularly polarized component has conventionally been known as an optical element using a cholesteric liquid crystal or the like.

To extract (selectively reflect) circularly polarized component in a broadened wave range, there has been proposed a circularly-polarized-light-extracting optical element composed of a laminate of a plurality of cholesteric liquid crystal layers having different pitches of liquid crystalline molecular helixes (Japanese Laid-Open Patent Publications No. 271731/1996 and No. 264907/1999). Further, Japanese Laid-Open Patent Publication No. 304770/1997, for example, discloses a polarized light source device and a liquid crystal display each containing such a circularly-polarized-light-extracting optical element.

The circularly-polarized-light-extracting optical element as described above is often used as a display member. As shown in FIG. 21, the circularly-polarized-light-extracting optical element 203 is often placed between circular polarizers (or elliptical polarizers) 201 and 202 arranged in the cross nicol disposition (combination of a right-handed circular polarizer and a left-handed circular polarizer), for example.

In the case where the circularly-polarized-light-extracting optical element is used as a display member in the above-described manner, it is necessary that the condition of polarization be uniform throughout the light-emitting surface of the display. It has been, however, found that bright and dark stripes can appear on the screen of a display to drastically lower the displaying quality of the display.

Through experiments and computer-aided simulations, we have made earnest studies to clear up the cause of the above-described phenomenon; and, as a result, we have found that this phenomenon occurs depending partly on the direction (director) in which liquid crystalline molecules are oriented on the surface of a circularly-polarized-light-extracting optical element.

In connection with the above phenomenon, we have also found the following: a circularly-polarized-light-extracting optical element made by laminating a plurality of cholesteric liquid crystal layers shows lowered optical activity depending partly on the constitution of the laminate of the two or more cholesteric liquid crystal layers; and, in particular, in the case where a cholesteric liquid crystal layer is directly applied to another cholesteric liquid crystal layer, the directors in planes in the vicinity of the interface of the two neighboring cholesteric liquid crystal layers are significant.

In a conventional circularly-polarized-light-extracting optical element as disclosed in Japanese Laid-Open Patent Publication No. 264907/1999, a plurality of cholesteric liquid crystal layers that have been made into films in advance are usually adhered either with an adhesive or thermally without using any adhesive.

In the case where an adhesive is used, the adhesion between the liquid crystalline molecules in the liquid crystal layer that has been made into a film and the molecules of the adhesive is required to be good. Therefore, not only the types of adhesives that can be used are limited, but also the resulting circularly-polarized-light-extracting optical element inevitably has a thickness increased by the thickness of the adhesive layer. In addition, the use of an adhesive brings such problems that reflection occurs at the interface of the adhesive layer and the liquid crystal layer due to the difference in refractive index between the two layers and that light extracted by the circularly-polarized-light-extracting optical element has the color of the adhesive layer itself.

In the case where liquid crystal layers are thermally adhered without using any adhesive, it is necessary to heat the liquid crystal layers that have been made into films to temperatures equal to or higher than their glass transition temperatures (Tg) to soften them. Industrialization of this method is therefore difficult from the viewpoints of the constitution of apparatus for thermal adhesion and handling. In addition, the liquid crystalline molecules in a liquid crystal layer and those in the neighboring liquid crystal layer are randomly intermingled when the liquid crystal layers are heated to high temperatures, causing deterioration of the optical properties.

Furthermore, whether an adhesive is used or not, it is necessary to employ an alignment layer and a substrate in order to align liquid crystalline molecules in the state of planar orientation. The resulting circularly-polarized-light-extracting optical element therefore has a thickness increased by the thickness of the alignment layer and that of the substrate. If an aligned film such as an oriented PET (polyethylene terephthalate) film is used as a substrate, it is possible to omit an alignment layer because the aligned film itself also serves as an alignment layer. Even in this case, the resulting circularly-polarized-light-extracting optical element has a thickness increased by the thickness of the aligned film. It seems effective that the alignment layer and the substrate are separated after the liquid crystal has been solidified. In this case, however, the liquid crystal layers are often damaged upon separation of the alignment layer and the substrate, decreasing the mass-productivity. Moreover, in the case where three or more liquid crystal layers are laminated, any of the above-described methods becomes considerably complicated; and, in addition, the substrates and the alignment layers in a number equal to the number of the liquid crystal layers are wasted.

In order to overcome these problems, there has been proposed such a method that a circularly-polarized-light-extracting layer is formed by coating a cholesteric liquid crystalline polymer layer with another cholesteric liquid crystalline polymer, as disclosed in Japanese Laid-Open Patent Publication No. 44816/1999.

This method is, however, disadvantageous in that it is difficult to always make the helical axes of cholesteric liquid crystalline molecules in the liquid crystal layers constant. Moreover, since a cholesteric liquid crystalline polymer is simply applied in the above method, the liquid crystalline molecules existing in the vicinity of the interface of two neighboring cholesteric liquid crystalline polymer layers are not oriented in one direction, and discontinuity is thus created in director at the interface of the two cholesteric liquid crystalline polymer layers. For this reason, the resulting circularly-polarized-light-extracting optical element shows lowered optical activity.

DISCLOSURE OF THE INVENTION

The present invention has been accomplished by taking the aforementioned drawbacks into consideration. A first object of the present invention is to provide a circularly-polarized-light-extracting optical element adapted to effectively prevent lowering of displaying quality that is brought about by bright and dark stripes that appear on the screen of a display even when the circularly-polarized-light-extracting optical element is placed between circular or elliptical polarizers arranged in the cross nicol disposition; a process of producing such a circularly-polarized-light-extracting optical element; a polarized light source device using the circularly-polarized-light-extracting optical element; and a liquid display using the circularly-polarized-light-extracting optical element.

A second object of the present invention is to provide a circularly-polarized-light-extracting optical element adapted to extracting circularly polarized light over a continuous selective reflection wave range having no optical singularity even if it is produced by laminating a plurality of liquid crystal layers; a process of producing such a circularly-polarized-light-extracting optical element; a polarized light source device using the circularly-polarized-light-extracting optical element; and a liquid display using the circularly-polarized-light-extracting optical element.

A first circularly-polarized-light-extracting optical element according to the first feature of the present invention comprises a liquid crystal layer having cholesteric regularity with liquid crystalline molecules in planar orientation, wherein the liquid crystalline molecules on one of the two main opposite surfaces of the liquid crystal layer are wholly oriented in substantially one direction (director) and the liquid crystalline molecules on the other main surface of the liquid crystal layer are also wholly oriented in substantially one direction (director).

In this circularly-polarized-light-extracting optical element, it is preferable that the director on one of the two main opposite surfaces of the liquid crystal layer be substantially parallel to that on the other main surface of the liquid crystal layer. The expression "substantially parallel" herein means that the discrepancy between the two directors is within the range of ±20°. It is also preferable that a helical structure consisting of liquid crystalline molecules with helical turns in a number of (0.5×integer) be present between the liquid crystalline molecules existing on the two main opposite surfaces of the liquid crystal layer.

A second circularly-polarized-light-extracting optical element according to the first feature of the present invention comprises a plurality of liquid crystal layers having cholesteric regularity with liquid crystalline molecules in planar orientation, the liquid crystal layers being successively and directly laminated, wherein the liquid crystal line molecules on one of the two main opposite outermost surfaces of the liquid crystal layers laminated are wholly oriented in substantially one direction (director) and the liquid crystalline molecules on the other main outermost surface of the liquid crystal layers laminated are also wholly oriented in substantially one direction (director).

In this circularly-polarized-light-extracting optical element, it is preferable that the director on one of the two main opposite outermost surfaces of the liquid crystal layers laminated be substantially parallel to that on the other main outermost surface of the liquid crystal layers laminated. The expression "substantially parallel" herein means that the discrepancy between the two directors is within the range of ±20°. It is also preferable that a helical structure consisting of liquid crystalline molecules with helical turns in a number of (0.5×integer) be present between the liquid crystalline molecules existing on the two main opposite outermost surfaces of the liquid crystal layers laminated. Moreover, it is preferable that the directors in planes in the vicinity of the interface of each two neighboring liquid crystal layers of the multiple liquid crystal layers laminated be substantially parallel to each other. The expression "substantially parallel" herein means that the discrepancy between the two directors is within the range of ±5°.

A first process of producing a circularly-polarized-light-extracting optical element according to the first feature of the present invention comprises the steps of coating an alignment layer whose entire surface has been treated so that its alignment-regulating action will act in substantially one direction, with liquid crystalline molecules comprising polymerizable monomer or oligomer molecules having cholesteric regularity, so as to align the liquid crystalline molecules by the alignment-regulating action of the alignment layer; three-dimensionally crosslinking the liquid crystalline molecules that have been aligned by the alignment-regulating action of the alignment layer, thereby forming a first liquid crystal layer; directly coating the first liquid crystal layer with another liquid crystalline molecules comprising polymerizable monomer or oligomer molecules having cholesteric regularity, so as to align the liquid crystalline molecules by the alignment-regulating action of the surface of the first liquid crystal layer that has been three-dimensionally crosslinked; and three-dimensionally crosslinking the liquid crystalline molecules that have been aligned by the alignment-regulating action of the surface of the three-dimensionally crosslinked first liquid crystal layer, thereby forming a second liquid crystal layer. In this production process, it is preferable to adjust the thickness of the first liquid crystal layer and that of the second liquid crystal layer so that the directors on the two main opposite surfaces of the first liquid crystal layer will be substantially parallel to each other and that the directors on the two main opposite surfaces of the second liquid crystal layer will be substantially parallel to each other. It is also preferable that, in the step of coating the alignment layer with the liquid crystalline molecules and aligning these liquid crystalline molecules to form the first liquid crystal layer, the alignment of the liquid crystalline molecules on the surface of the first liquid crystal layer be regulated by applying another alignment layer to the surface of the first liquid crystal layer at the opposite of the firstly provided alignment layer.

A second process of producing a circularly-polarized-light-extracting optical element according to the first feature of the present invention comprises the steps of coating an alignment layer whose entire surface has been treated so that its alignment-regulating action will act in substantially one direction, with a liquid crystalline polymer having cholesteric regularity, so as to align the liquid crystalline polymer by the alignment-regulating action of the alignment layer; cooling the liquid crystalline polymer that has been oriented by the alignment-regulating action of the alignment layer to transform it into the glassy sate, thereby forming a first liquid crystal layer; directly coating the first liquid crystal layer with another liquid crystalline polymer having cholesteric regularity, so as to align the liquid crystalline polymer by the alignment-regulating action of the surface of the first liquid crystal layer that has been transformed into the glassy state; and cooling the liquid crystalline polymer that has been aligned by the alignment-regulating action of the surface of the first liquid crystal layer in the glassy state to transform it into the glassy state, thereby forming a second liquid crystal layer. In this production process, it is preferable to adjust the thickness of the first liquid crystal layer and that of the second liquid crystal layer so that the directors on the two main opposite surfaces of the first liquid crystal layer will be substantially parallel to each other and that the directors on the two main opposite surfaces of the second liquid crystal layer will be substantially parallel to each other. It is also preferable that, in the step of coating the alignment layer with the liquid crystal line polymer and aligning the liquid crystalline polymer to form the first liquid crystal layer, the alignment of the liquid crystalline polymer on the surface of the first liquid crystal layer be regulated by applying another alignment layer to the surface of the first liquid crystal layer at the opposite of the firstly provided alignment layer.

A polarized light source device according to the first feature of the present invention comprises: a light source; and the above-described circularly-polarized-light-extracting optical element, which receives light emitted from the light source and transmits polarized light.

A liquid crystal display according to the first feature of the present invention comprises: the above-described polarized light source device; and a liquid crystal cell which receives polarized light emitted from the polarized light source device and transmits the polarized light while changing the transmittance for it.

According to the first feature of the present invention, the liquid crystal line molecules on one of the two main opposite surfaces of a liquid crystal layer are wholly oriented in substantially one direction and the liquid crystalline molecules on the other main surface of the liquid crystal layer are also wholly oriented in substantially one direction. Therefore, even in the case where the resulting circularly-polarized-light-extracting optical element is placed between circular or elliptical polarizers arranged in the cross nicol disposition, it is possible to effectively prevent lowering of displaying quality that is caused by the appearance of bright and dark stripes on the screen of a display.

Further, by making the director on one of the two main opposite surfaces of the liquid crystal layer substantially parallel to that on the other main surface, it is possible to more effectively prevent the appearance of bright and dark stripes.

A first circularly-polarized-light-extracting optical element according to the second feature of the present invention comprises a plurality of liquid crystal layers having cholesteric regularity, wherein the liquid crystal layers are laminated so that the helical axes of the liquid crystalline molecules will point in substantially one direction, and the directors in planes in the vicinity of the interface of each two neighboring liquid crystal layers of the multiple liquid crystal layers laminated substantially coincide with each other. In this circularly-polarized-light-extracting optical element, it is preferable that each liquid crystal layer comprises either polymerizable monomer or oligomer molecules that have been three-dimensionally crosslinked, or a liquid crystalline polymer.

In this circularly-polarized-light-extracting optical element, at least one of the multiple liquid crystal layers has a pitch of the molecular helix in the helical structure consisting of liquid crystalline molecules, different from that of the molecular helix in the helical structure in the other liquid crystal layers.

It is also preferable that the thickness of each liquid crystal layer be smaller than the thickness required for the liquid crystal layer to reflect, with a maximum reflectance, either right-handed or left-handed circularly polarized component of light having a specific wavelength, contained in incident light.

It is also preferable that the directions of rotation of the liquid crystalline molecules in the respective liquid crystal layers be the same. It is also preferable that at least two of the multiple liquid crystal layers have selective reflection wave ranges whose center regions do not agree with each other and whose end regions are partially overlapped.

A second circularly-polarized-light-extracting optical element according to the second feature of the present invention comprises: a plurality of liquid crystal layers having cholesteric regularity; and a transition liquid crystal layer provided between at least any two neighboring liquid crystal layers of the multiple liquid crystal layers, in which the pitch of the molecular helix in the helical structure consisting of liquid crystalline molecules varies in the direction of thickness, wherein the liquid crystal layers are laminated so that the helical axes of the liquid crystalline molecules will point in substantially one direction; the directors in planes in the vicinity of the interface of each two neighboring liquid crystal layers of the multiple liquid crystal layers substantially coincide with each other; the pitch of the molecular helix in one of the two liquid crystal layers between which the transition liquid crystal layer is provided is different from that of the molecular helix in the other liquid crystal layer; and the pitch of the molecular helix on one surface of the transition liquid crystal layer is substantially equal to that of the molecular helix in the liquid crystal layer which is in contact with one surface of the transition liquid crystal layer, while the pitch of the molecular helix on the other surface of the transition liquid crystal layer is substantially equal to that of the molecular helix in the other liquid crystal layer which is in contact with the other surface of the transition liquid crystal layer.

A first process of producing a circularly-polarized-light-extracting optical element according to the second feature of the present invention comprises the steps of: coating an alignment layer with liquid crystalline molecules comprising polymerizable monomer or oligomer molecules having cholesteric regularity, so as to align the liquid crystalline molecules by the alignment-regulating action of the alignment layer; three-dimensionally crosslinking the liquid crystalline molecules that have been aligned by the alignment-regulating action of the alignment layer, thereby forming a first liquid crystal layer; directly coating the first liquid crystal layer with another liquid crystalline molecules comprising polymerizable monomer or oligomer molecules having cholesteric regularity, so as to align the liquid crystalline molecules by the alignment-regulating action of the surface of the first liquid crystal layer that has been three-dimensionally crosslinked; and three-dimensionally crosslinking the liquid crystalline molecules that have been aligned by the alignment-regulating action of the surface of the three-dimensionally crosslinked first liquid crystal layer, thereby forming a second liquid crystal layer.

A second process of producing a circularly-polarized-light-extracting optical element according to the second feature of the present invention comprises the steps of: coating an alignment layer with a liquid crystalline polymer having cholesteric regularity, so as to align the liquid crystalline polymer by the alignment-regulating action of the alignment layer; cooling the liquid crystalline polymer that has been aligned by the alignment-regulating action of the alignment layer to transform it into the glassy sate, thereby forming a first liquid crystal layer; directly coating the first liquid crystal layer with another liquid crystalline polymer having cholesteric regularity, so as to align the liquid crystalline polymer by the alignment-regulating action of the surface of the first liquid crystal layer that has been transformed into the glassy state; and cooling the liquid crystalline polymer that has been aligned by the alignment-regulating action of the surface of the first liquid crystal layer in the glassy state to transform it into the glassy state, thereby forming a second liquid crystal layer.

A polarized light source device according to the second feature of the present invention comprises: a light source; and the above-described circularly-polarized-light-extracting optical element, which receives light emitted from the light source and transmits polarized light.

A liquid crystal display according to the second feature of the present invention comprises: the above-described polarized light source device; and a liquid crystal cell that receives polarized light emitted from the polarized light source device and transmits the polarized light while changing the transmittance for it.

According to the second feature of the present invention, the directors in planes in the vicinity of the interface of each two neighboring liquid crystal layers of multiple liquid crystal layers substantially coincide with each other. Therefore, even if a circularly-polarized-light-extracting optical element is obtained by laminating a plurality of liquid crystal layers, it is possible to fully bring out the property of reflecting circularly polarized light characteristic of the cholesteric structure and to obtain circularly polarized light over a continuous selective reflection wave range having no optical singularity. Namely, if the directors do not substantially coincide with each other, optical singularity is created. Therefore, when the spectral reflectance is measured by the use of circularly polarized light, discontinuity is found in the selective reflection wavelength. In particular, by directly coating a firstly formed liquid crystal layer whose surface has aligning action, with another liquid crystal layer to align, by this aligning action, the liquid crystalline molecules in the liquid crystal layer secondly formed, it is possible to easily make the directors in planes in the vicinity of the interface of the two neighboring liquid crystal layers substantially coincide with each other.

If the liquid crystal layers are made so that the pitches of the molecular helixes in the respective liquid crystal layers are different from each other, it is possible to extract circularly polarized component of light having any desired wavelength.

In particular, if the thickness of each liquid crystal layer is made smaller than the thickness required for the liquid crystal layer to reflect, with a maximum reflectance, either right-handed or left-handed circularly-polarized component of light having a specific wavelength, contained in incident light so that this circularly polarized component will be reflected with a reflectance lower than the maximum reflectance, the resulting circularly-polarized-light-extracting optical element can be used in various optical devices with which this circularly polarized component can be extracted with a desired reflectance or transmittance.

If the directions of rotation of the liquid crystalline molecules in the respective liquid crystal layers are made identical, it is possible to avoid the formation of optical discontinuity between the liquid crystal layers.

In particular, if a circularly-polarized-light-extracting optical element contains at least two liquid crystal layers having selective reflection wave ranges whose center wavelengths are different from each other, the optical element can have a continuous, broadened selective reflection wave range.

If a transition liquid crystal layer in which the pitch of the molecular helix varies in the direction of thickness is provided between each two liquid crystal layers, the resulting circularly-polarized-light-extracting optical element can have smooth optical properties.

In the aforementioned first and second features, polymerizable monomer or oligomer molecules that can be three-dimensionally crosslinked, as well as liquid crystalline polymers may be used to form the liquid crystal layers. These materials will be explained in detail in the following description of embodiments of the invention.

BEST MODE FOR CARRYING OUT THE INVENTION

By referring to the accompanying drawings, embodiments of the present invention will be described hereinafter.

First Embodiment

The first embodiment of the present invention will be described by referring to FIG. 1 to FIG. 10B.

Figure 1:
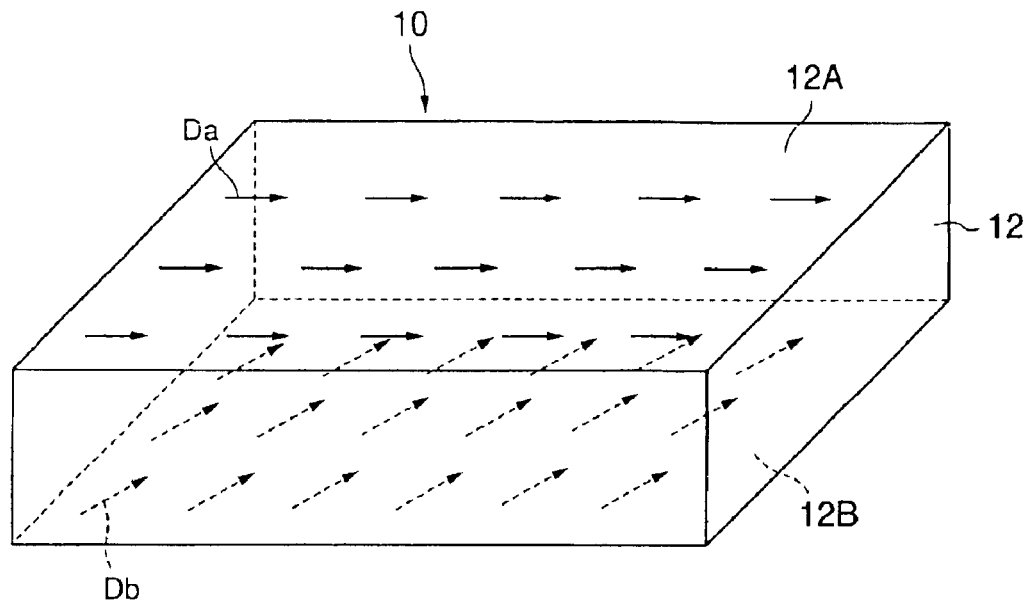
FIG. 1 is an enlarged perspective view diagrammatically showing a part of a circularly-polarized-light-extracting optical element according to the first example of the first embodiment of the present invention.

A circularly-polarized-light-extracting optical element 10 according to the first example of this embodiment will firstly be described by referring to FIG. 1.

As shown in FIG. 1, this circularly-polarized-light-extracting optical element 10 includes a liquid crystal layer 12 having cholesteric regularity (cholesteric structure) with liquid crystalline molecules in planar orientation. The liquid crystalline molecules on a surface 12A, which is one of the two main opposite surfaces (larger surfaces) 12A and 12B of the liquid crystal layer 12, are wholly oriented in substantially one direction (director Da) and the liquid crystalline molecules on the other main surface 12B of the liquid crystal layer 12 are also wholly oriented in substantially one direction (director Db).

In general, the liquid crystal layer 12 having cholesteric regularity has the rotated-light-selecting property (polarized-light-separating property), that is, the property of separating a component optically rotated (circularly polarized) in one direction from a component optically rotated in the opposite direction according to the physical orientation (planar orientation) of the liquid crystalline molecules in the liquid crystal layer.

Natural light (non-polarized light) entering into such a liquid crystal layer 12 having cholesteric regularity along the helical axis of the planar orientation is split into two circularly polarized components, that is, right-handed circularly polarized component and left-handed circularly polarized component; one of these circularly polarized components is transmitted and the other one is reflected. This phenomenon is known as circular dichroism. If the direction of rotation of the liquid crystalline molecules constituting a helical structure is properly selected, the component circularly polarized in the same direction as this direction of rotation is selectively reflected.

In this case, the scattering of rotated light becomes maximum at the wavelength $\lambda_0$ defined by the following equation (1):

$$\lambda 0 = nav \cdot p \qquad (1)$$

wherein $p$ is a helical pitch of a liquid crystalline molecular helix in a helical structure, and $nav$ is a mean refractive index in a plane perpendicular to the helical axis.

Further, the waveband width $\Delta\lambda$ of the reflected light is represented by the following equation (2):

$$\Delta\lambda = \Delta n \cdot p \qquad (2)$$

wherein $\Delta n$ is an index of double refraction.

Namely, with respect to non-polarized light incident on such a liquid crystal layer 12 having cholesteric regularity, either right- or left-handed circularly polarized component of light in a wave range with a center wavelength $\lambda_0$, having a waveband width $\Delta\lambda$ is reflected, and the other circularly polarized component and light (non-polarized light) in a wave range excluding the reflection wave range are transmitted. Upon reflection, the right- or left-handed circularly polarized component is reflected as it is without undergoing inversion of phase unlike in the case of ordinary reflection of light.

The liquid crystalline molecules are oriented in substantially one direction (director Da) on the entire surface 12A and in substantially one direction (director Db) on the entire surface 12B. The expression "the molecules are oriented in substantially one direction (director)" (or "directors substantially coincide with each other") as used in this specification includes the case where the directions in which liquid crystalline molecules are oriented are different by an angle of approximately 180°, that is, such a case that heads and tails of liquid crystalline molecules are in the same direction. This is because, in many cases, the head of a liquid crystalline molecule is optically indistinguishable from its tail. The same is true for the case which will be described later (the case where the director Da on the surface 12A and the director Db on the surface 12B are substantially parallel to each other).

Whether or not the liquid crystalline molecules are oriented in substantially one direction (director Da and Db) can be known by observing the cross section of the liquid crystal layer 12 by a transmission electron microscope. Specifically, when the cross section of the liquid crystal layer 12 having cholesteric regularity, in which liquid crystalline molecules are solidified, is observed by a transmission electron microscope, bright and dark stripes are observed corresponding to the pitch of the molecular helix characteristic of the cholesteric structure. If the bright and dark stripes that appear on the surface 12A or 12B are seen uniformly in terms of concentration, it can be judged that the liquid crystalline molecules on this surface are oriented in substantially one direction.

Next, by referring to FIG. 2, a circularly-polarized-light-extracting optical element 20 according to the second example of this embodiment will be described.

Figure 2:
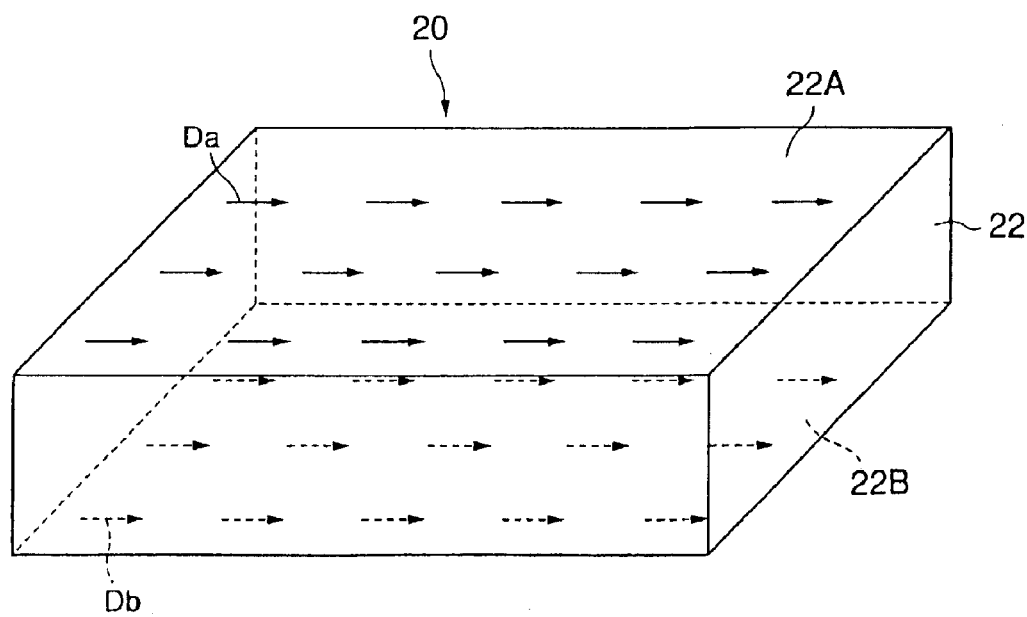
FIG. 2 is an enlarged perspective view diagrammatically showing a part of a circularly-polarized-light-extracting optical element according to the second example of the first embodiment of the present invention.
Figure 3A:
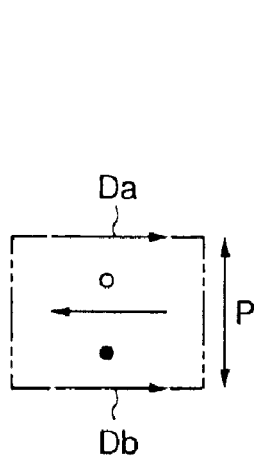
FIGS. 3A, 3B and 3C are diagrammatical views showing the relationship between helical pitch in a helical structure consisting of liquid crystal line molecules having cholesteric regularity and directors on the surfaces of a liquid crystal layer.
Figure 3B:
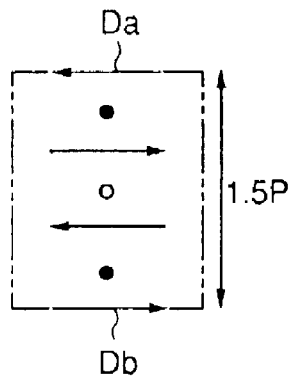
Figure 3C:
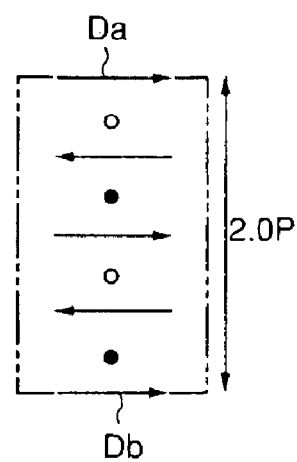
Figure 4:
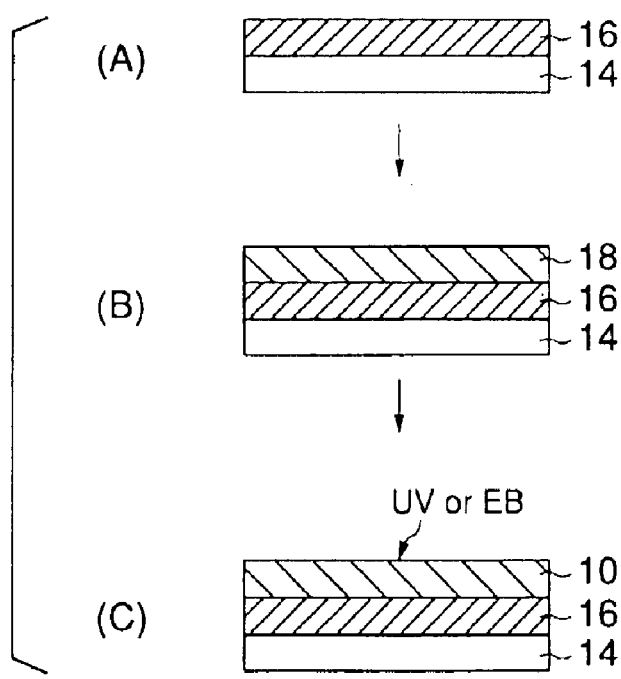
FIG. 4 is a diagrammatical cross-sectional view illustrating a first process of producing a circularly-polarized-light-extracting optical element according to the first embodiment of the present invention.

As shown in FIG. 2, the circularly-polarized-light-extracting optical element 20 includes a liquid crystal layer 22 having cholesteric regularity with liquid crystalline molecules in planar orientation. The liquid crystalline molecules on a surface 22A, which is one of the two main opposite surfaces (larger surfaces) 22A and 22B of the liquid crystal layer 22, are wholly oriented in substantially one direction (director Da) and the liquid crystalline molecules on the other main surface 22B of the liquid crystal layer 22 are also wholly oriented in substantially one direction (director Db). In addition, the director Da on the main surface 22A and the director Db on the main surface 22B are substantially parallel to each other. The expression "substantially parallel" herein means that the discrepancy between the director Da and the director Db is within the range of ±20°.

In this circularly-polarized-light-extracting optical element 20, in order to orient the liquid crystalline molecules in precisely one direction (director Da and Db) on each one of the two opposite surfaces 22A and 22B, it is preferable that the thickness of the liquid crystal layer 20 be made (½×integer) times the pitch of the molecular helix in the helical structure consisting of the liquid crystalline molecules. If the thickness of the liquid crystal layer 20 is so made, the thickness can optically be divided without a remainder by a value equal to the half of the pitch p of the helix of the liquid crystalline molecules having cholesteric regularity, as diagrammatically shown in FIGS. 3A, 3B and 3C. There can thus be prevented optical deviation from the above-described simplified theoretical equation (1), in particular, disorder of the state of polarization that occurs due to difference in phase shift.

To form the liquid crystal layers 12 and 22 of the circularly-polarized-light-extracting optical elements 10 and 20, polymerizable monomers or oligomers that can be three-dimensionally cross-linked, as well as liquid crystalline polymers can be used.

Examples of three-dimensionally crosslinkable, polymerizable monomers useful for forming the liquid crystal layers include liquid crystalline monomers and mixtures of chiral compounds as disclosed in Japanese Laid-Open Patent Publication No. 258638/1995 and Published Japanese Translation No. 508882/1998 of PCT International Publication. Examples of polymerizable oligomers that can be used to form the liquid crystal layers include cyclic organopolysiloxane compounds having cholesteric phases as disclosed in Japanese Laid-Open Patent Publication No. 165480/1982. By "three-dimensional crosslinking" is herein meant that polymerizable monomer or oligomer molecules are three-dimensionally polymerized to give a network structure. If such a network structure is formed, the liquid crystalline molecules in the cholesteric liquid crystalline state are optically fixed as they are, and a film that is easy to handle as an optical film and that is stable at normal temperatures can be obtained.

Examples of liquid crystalline polymers useful for forming the liquid crystal layers include polymers having mesogen group, which makes the polymers liquid crystalline, in their main chain or side chains, or both main chain and side chains, polymeric cholesteric liquid crystals having cholesteryl group in their side chains, and liquid crystalline polymers as disclosed in Japanese Laid-Open Patent Publications No. 133810/1997 and No. 293252/1999.

Next, processes of producing the circularly-polarized-light-extracting optical elements 10 and 20 according to this embodiment, having the above-described constitutions will be described hereinafter.

(First Production Process)

First of all, a production process in which a polymerizable monomer or oligomer is used for forming a liquid crystal layer will be described by referring to FIGS. 4(A) to 4(C).

In this production process, an alignment layer 16 is firstly formed on a glass substrate 14, as shown in FIG. 4(A). Polymerizable monomer molecules (or polymerizable oligomer molecules) 18 are then applied as liquid crystalline molecules to the alignment layer 16, as shown in FIG. 4(B), thereby aligning these molecules by the alignment-regulating action of the alignment layer 16. The polymerizable monomer (or polymerizable oligomer) 18 thus forms a liquid crystal phase.

Next, polymerization of the polymerizable monomer (or polymerizable oligomer) 18 is initiated with the molecular orientation maintained, by applying ultraviolet light with a photopolymerization initiator being added in it, or is directly initiated by applying an electron beam, as shown in FIG. 4(C), thereby three-dimensionally crosslinking (polymerizing) and solidifying the polymerizable monomer (or polymerizable oligomer) 18. A circularly-polarized-light-extracting optical element 10 composed of a single liquid crystal layer is thus obtained.

In the above process, if the alignment layer 16 is wholly treated in advance so that its alignment-regulating action will act in substantially one direction, it is possible to align, in substantially one direction, those liquid crystalline monomers that are brought in contact with the alignment layer 16. To align the liquid crystalline molecules on the entire surface 12A, which is in contact with the alignment layer 16, in substantially one direction (director Da) and to align the liquid crystal line molecules on the entire surface 12B at the opposite of the surface 12A in substantially one direction (director Db), as shown in FIG. 1, it is enough to make the thickness of the liquid crystal layer 12 uniform. Further, in a series of the steps shown in FIGS. 4(A) to 4(C), after the step of coating the alignment layer 16 with the polymerizable monomer molecules (or polymerizable oligomer molecules) 18 and before the step of three-dimensionally crosslinking these molecules, the following step may be added: as shown in FIGS. 5(A) to 5(D), a second alignment layer 16A is laid on the polymerizable monomer molecules (or polymerizable oligomer molecules) 18 applied (FIG. 5(C)), and ultraviolet light or an electron beam is applied, like in the step shown in FIG. 4(C), to three-dimensionally cross-link the polymerizable monomer molecules (or polymerizable oligomer molecules) 18 sandwiched between the alignment layer 16 and the second alignment layer 16A (FIG. 5(D)). In this case, to obtain a circularly-polarized-light-extracting optical element 20 as shown in FIG. 2, it is necessary to make the direction in which the alignment-regulating action of the second alignment layer 16A acts equal to that in which the alignment-regulating action of the alignment layer 16 acts. Further, the second alignment layer 16A may be separated from the liquid crystal layer after the application of ultraviolet light or an electron beam.

The polymerizable monomer (or polymerizable oligomer) 18 may be made into a coating liquid by dissolving it in a solvent. If such a coating liquid is used, it is necessary to add the drying step of evaporating the solvent before the step of three-dimensionally crosslinking the polymerizable monomer (or polymerizable oligomer) 18 by the application of ultraviolet light or an electron beam.

In the case where the polymerizable monomer (or polymerizable oligomer) 18 is made into a liquid crystal layer at a prescribed temperature, the liquid crystal layer is nematic. If any chiral agent is added to this nematic liquid crystal, a chiral nematic liquid crystal (cholesteric liquid crystal) can be obtained. Specifically, it is preferable to add a chiral agent to the polymerizable monomer or oligomer in an amount of several to 10%. By varying the chiral power by changing the type of the chiral agent to be added, or by varying the concentration of the chiral agent, it is possible to control the selective reflection wave range, which is determined by the cholesteric structure of the polymerizable monomer or oligomer.

The alignment layer 16 and/or the second alignment layer 16A can be formed by a conventionally known method. For example, the alignment layer may be formed by a method in which a polyimide film is formed on the glass substrate 14 and is then rubbed as described above, or a method in which the glass substrate 14 is covered with a polymeric compound film that will become an optical alignment layer and polarized UV (ultraviolet light) is applied to this film. An oriented PET (polyethylene terephthalate) film or the like may also be used to obtain the alignment layer.

(Second Production Process)

Next, a production process in which a liquid crystalline polymer is used to form a liquid crystal layer will be described by referring to FIGS. 6(A) to 6(C).

In this production process, an alignment layer 16 is firstly formed on a glass substrate 14, as shown in FIG. 6(A), like in the aforementioned first production process.

As shown in FIG. 6(B), a liquid crystalline polymer 32 having cholesteric regularity is applied to the alignment layer 16 and is oriented by the alignment-regulating action of the alignment layer 16. The liquid crystalline polymer 32 applied thus forms a liquid crystal phase.

Thereafter, as shown in FIG. 6(C), the liquid crystalline polymer 32 is cooled to a temperature equal to or lower than its glass transition temperature (Tg) to transform it into the glassy state, thereby obtaining a circularly-polarized-light-extracting optical element 30 composed of a single liquid crystal layer.

In this production process, the liquid crystalline polymer 32 may be made into a coating liquid by dissolving it in a solvent. If such a coating liquid is used, it is necessary to add, before the cooling step, the drying step of evaporating the solvent.

There may be used, as the liquid crystalline polymer, a cholesteric liquid crystalline polymer itself having chirality, or a mixture of a nematic liquid crystalline polymer and a cholesteric liquid crystalline polymer.

The state of such a liquid crystalline polymer changes with temperature. For example, a liquid crystalline polymer having a glass transition temperature of 90° C. and an isotropic transition temperature of 200° C. is in the state of cholesteric liquid crystal at a temperature between 90° C. and 200° C.; if this polymer is cooled to room temperature, it is solidified to the glassy state with its cholesteric structure maintained.

If a cholesteric liquid crystalline polymer is used, the chiral power in the liquid crystalline polymer may be adjusted by any known method in order to control the incident light selective reflection wave range, which is determined by the cholesteric structure of the liquid crystalline polymer. If a mixture of a nematic liquid crystalline polymer and a cholesteric liquid crystalline polymer is used, the mixing ratio of these two polymers may be adjusted for this purpose.

Also in this second production process, if the alignment layer 16 is wholly treated in advance so that its alignment-regulating action will act in substantially one direction, it is possible to align, in substantially one direction, those liquid crystal line molecules that are brought into contact with the alignment layer 16.

Figure 5:
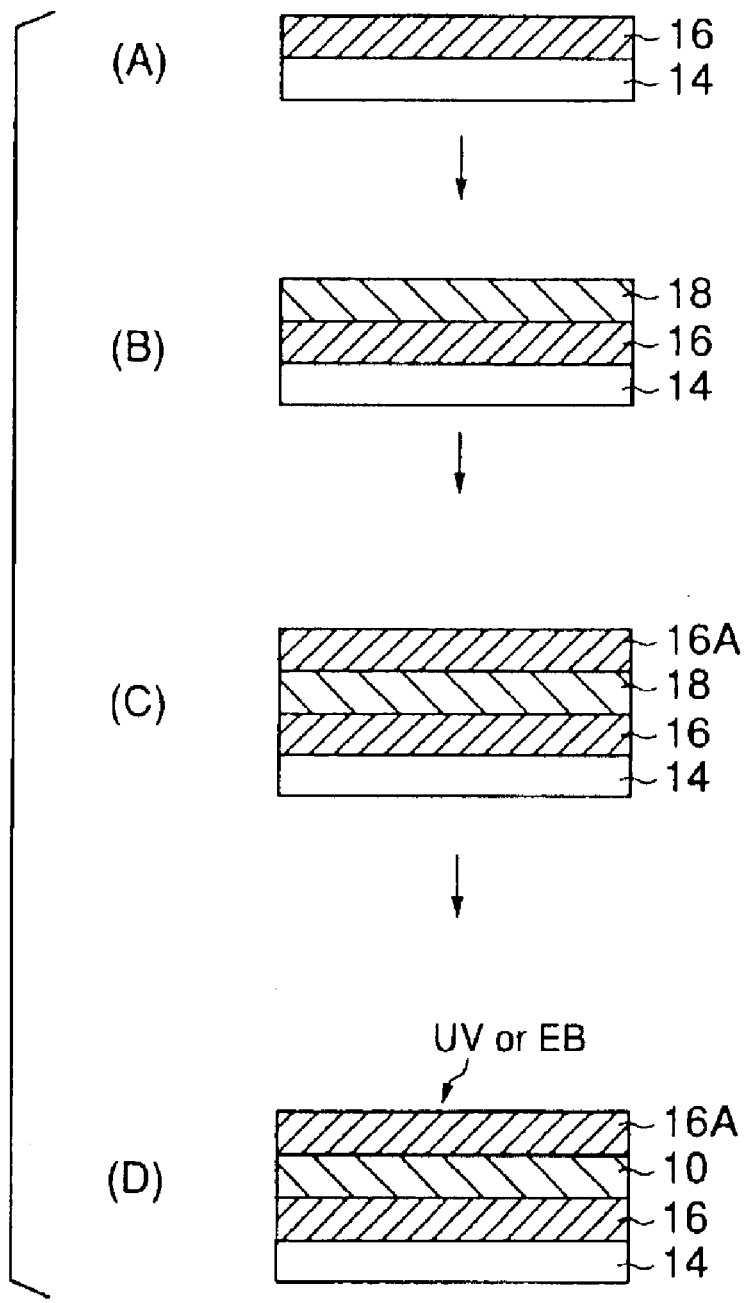
FIG. 5 is a diagrammatical cross-sectional view illustrating a variation of the first process of producing a circularly-polarized-light-extracting optical element according to the first embodiment of the present invention.
Figure 6:
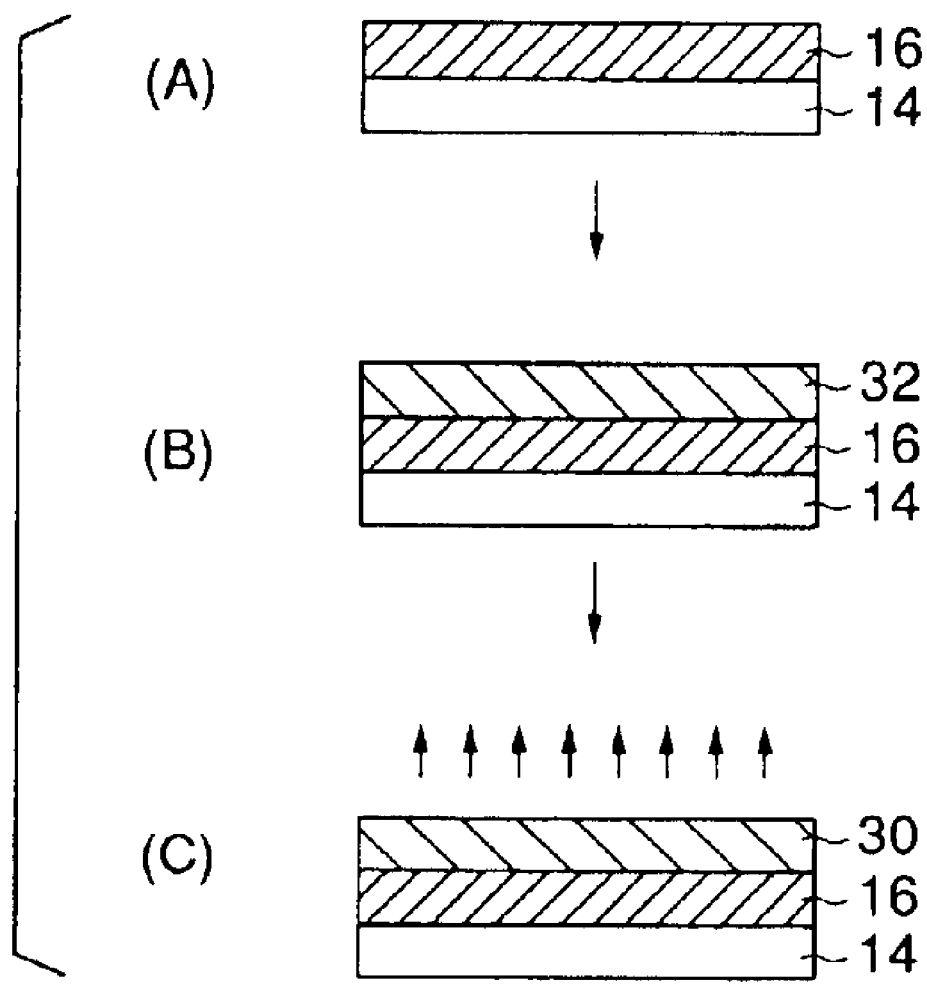
FIG. 6 is a diagrammatical cross-sectional view illustrating a second process of producing a circularly-polarized-light-extracting optical element according to the first embodiment of the present invention.
Figure 7:
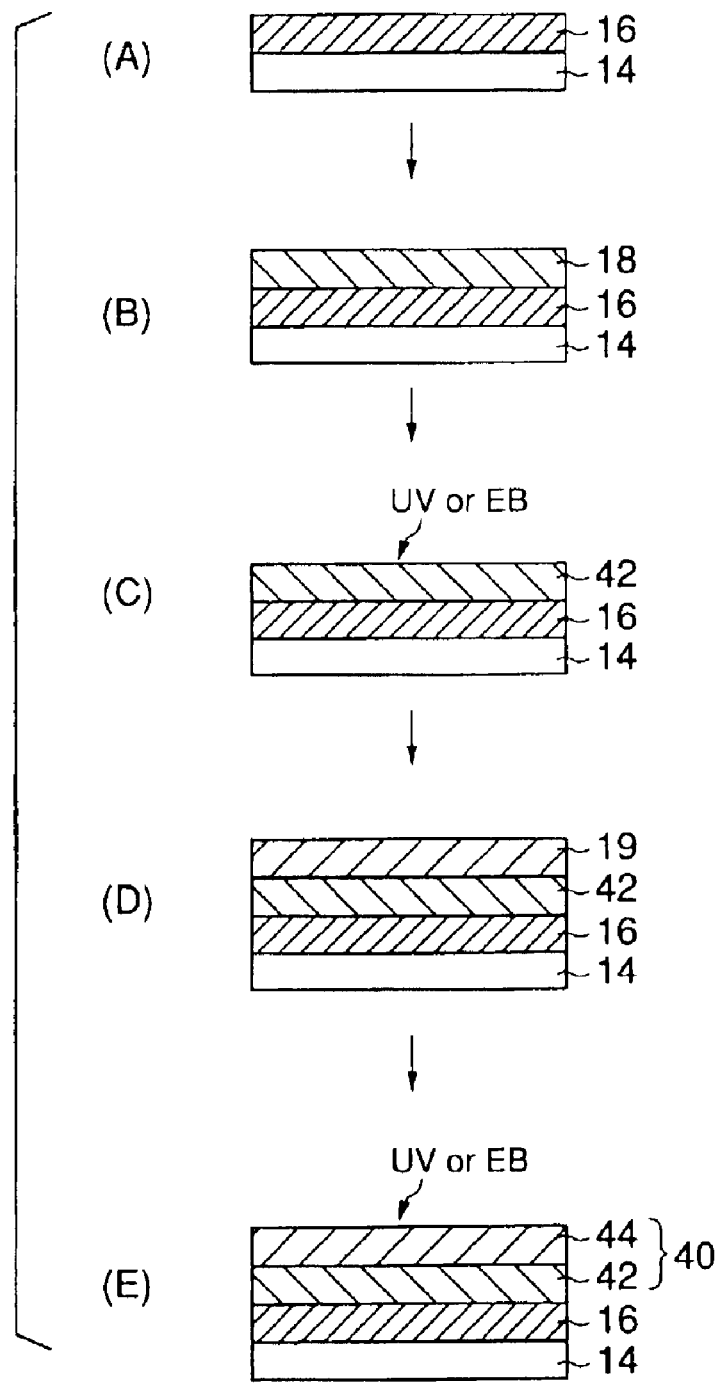
FIG. 7 is a diagrammatical cross-sectional view illustrating a first process of producing a multi-layered circularly-polarized-light-extracting optical element according to the first embodiment of the present invention.

To make the director on the non-alignment-layer-side surface of the liquid crystal layer coincide with the direction in which the alignment-regulating action acts (i.e., the director on the surface of the liquid crystal layer that is in contact with the alignment layer 16), the thickness of the liquid crystal layer may be made (½×integer) times the pitch of the molecular helix in the helical structure consisting of the liquid crystalline molecules as mentioned previously, or a second alignment layer 16A as shown in FIG. 5 may be employed.

The aforementioned circularly-polarized-light-extracting optical elements 10, 20 and 30 according to this embodiment of the invention have a single-layered structure composed of one liquid crystal layer. This embodiment is, however, not limited to this, and the circularly-polarized-light-extracting optical element may be made to have a multi-layered structure.

Specifically, like a circularly-polarized-light-extracting optical element 40 as shown in FIG. 7(E), a plurality of liquid crystal layers 42 and 44 having cholesteric regularity with liquid crystalline molecules in planar orientation may be directly and successively laminated. In this multi-layered circularly-polarized-light-extracting optical element 40, the liquid crystal line molecules on one of the two main opposite outermost surfaces of the liquid crystal layers 42 and 44 laminated are wholly oriented in substantially one direction and the liquid crystalline molecules on the other main outermost surface are also wholly oriented in substantially one direction, as shown in FIG. 1. In addition, it is preferable that the director on one of the two main opposite outermost surfaces of the liquid crystal layers laminated be substantially parallel to that on the other main outermost surface. By "substantially parallel" herein means that the discrepancy between the two directors is within the range of ±20°. In this circularly-polarized-light-extracting optical element 40, it is preferable that the total thickness of the liquid crystal layers 42 and 44 be made (½×integer) times the pitch of the molecular helix in the helical structure consisting of the liquid crystalline molecules in order to align the liquid crystalline molecules on one of the two main opposite outermost surfaces of the liquid crystal layers 42 and 44 laminated in precisely one direction and to align the liquid crystalline molecules on the other outermost surface in precisely one direction. It is also preferable that the directors in planes in the vicinity of the interface of the two neighboring liquid crystal layers 42 and 44 be substantially parallel to each other. The expression "substantially parallel" herein means that the discrepancy between the two directors is within the range of ±5°.

A process of producing a multi-layered circularly-polarized-light-extracting optical element will be described hereinafter.

(First Production Process)

A production process of which polymerizable monomers or oligomers are used to form liquid crystal layers will firstly be explained by referring to FIGS. 7(A) to 7(E).

In this production process, an alignment layer 16 is firstly formed on a glass substrate 14, as shown in FIG. 7(A). Polymerizable monomer molecules (or polymerizable oligomer molecules) 18 are then applied as liquid crystalline molecules to the alignment layer 16, as shown in FIG. 7(B), thereby aligning these molecules by the alignment-regulating action of the alignment layer 16.

Polymerization of the polymerizable monomer (or polymerizable oligomer) 18 is initiated with the molecular orientation maintained, by applying ultraviolet light with a photo polymerization initiator being added in it, or by simply applying an electron beam, as shown in FIG. 7(C), thereby three-dimensionally crosslinking the polymerizable monomer (or polymerizable oligomer) 18. The polymerizable monomer (or polymerizable oligomer) 18 is thus solidified to give a first liquid crystal layer 42.

Figure 8:
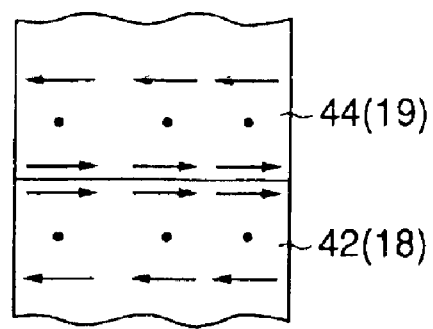
FIG. 8 is a diagrammatical view showing the directors in planes in the vicinity of the interface of two neighboring liquid crystal layers in a multi-layered circularly-polarized-light-extracting optical element according to the first embodiment of the present invention.
Figure 9:
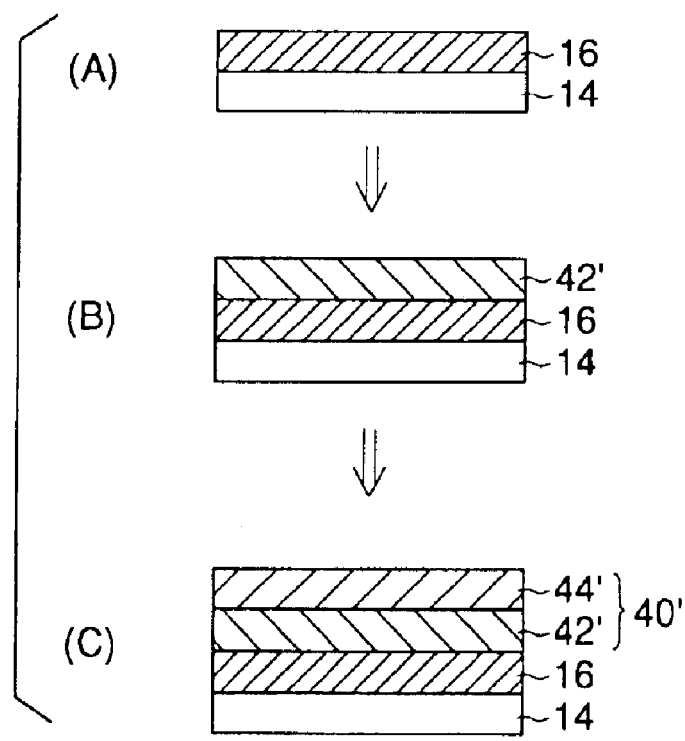
FIG. 9 is a diagrammatical cross-sectional view illustrating a second process of producing a multi-layered circularlypolarized-light-extracting optical element according to the first embodiment of the present invention.

As shown in FIG. 7(D), another polymerizable monomer (or polymerizable oligomer) 19 prepared separately is directly applied to the first liquid crystal layer 42 that has been three-dimensionally cross-linked, and, as shown in FIG. 8, is aligned by the alignment-regulating action of the surface of the three-dimensionally cross-linked first liquid crystal layer 42. To this polymerizable monomer (or polymerizable oligomer) 19, ultraviolet light is applied with a photopolymerization initiator being added in it, or an electron beam is simply applied, as shown in FIG. 7(E), thereby three-dimensionally crosslinking the polymerizable monomer (or polymerizable oligomer) 19. The polymerizable monomer (or polymerizable oligomer) 19 is thus solidified to give a second liquid crystal layer 44, whereby a two-layered circularly-polarized-light-extracting optical element 40 is obtained.

To obtain a multi-layered circularly-polarized-light-extracting optical element composed of three or more layers, the above-described steps (FIGS. 7(D) and 7(E)) are repeated to successively laminate liquid crystal layers in the number required.

Also in this production process, if the alignment layer 16 is wholly treated in advance so that its alignment-regulating action will act in substantially one direction, it is possible to align, in substantially one direction, those liquid crystal line molecules that are brought into contact with the alignment layer 16. In addition, a second alignment layer 16A as shown in FIG. 5 may be formed when the first liquid crystal layer 42 is solidified by conducting three-dimensional crosslinking, thereby aligning, in substantially one direction, the liquid crystal line molecules on the main surface of the liquid crystal layer 42 at the opposite of the alignment layer 16. In the production of a multi-layered circularly-polarized-light-extracting optical element composed of three or more liquid crystal layers, the above procedure may be effected for the second and later liquid crystal layers.

To make the directors on the two main opposite outermost surfaces of the liquid crystal layers 42 and 44 in the circularly-polarized-light-extracting optical element 40 substantially parallel to each other, it is preferable to control the thickness of the liquid crystal layer 44 so that the director in the topmost plane in the liquid crystal layers will be substantially parallel to that in the lowermost plane in the liquid crystal layers, as shown in FIG. 3. By doing so, it is possible to more surely make the directors on the two main opposite outermost surfaces parallel to each other.

(Second Production Process)

A production process in which liquid crystalline polymers are used to form liquid crystal layers will be described by referring to FIGS. 9(A) to 9(C).

In this production process, an alignment layer 16 is firstly formed on a glass substrate 14, as shown in FIG. 9(A), like in the above-described first production process.

As shown in FIG. 9(B), a liquid crystalline polymer having cholesteric regularity is applied to the alignment layer 16 and is aligned by the alignment-regulating action of the alignment layer 16. Thereafter, this liquid crystalline polymer is cooled to a temperature equal to or lower than its glass transition temperature (Tg), thereby transforming it into the glassy state to form a first liquid crystal layer 42'.

As shown in FIG. 9(C), another liquid crystalline polymer having cholesteric regularity, separately prepared is directly applied to the first liquid crystal layer 42' and is aligned by the alignment-regulating action of the surface of the first liquid crystal layer 42' in the glassy state. This liquid crystalline polymer is then cooled to a temperature equal to or lower than its glass transition temperature (Tg) in the manner as described above, thereby transforming it into the glassy state to form a second liquid crystal layer 44'. A two-layered circularly-polarized-light-extracting optical element is thus obtained.

To obtain a multi-layered circularly-polarized-light-extracting optical element composed of three or more liquid crystal layers, the above-described step (FIG. 9(C)) is repeated.

Also in this production process, if the alignment layer 16 is wholly treated in advance so that its the alignment-regulating action will act in substantially one direction, it is possible to align, in substantially one direction, those liquid crystal line molecules that are brought into contact with the alignment layer 16. In addition, a second alignment layer 16A as shown in FIG. 5 may be formed when the first liquid crystal layer 42' is solidified by conducting three-dimensional crosslinking, thereby aligning, in substantially one direction, the liquid crystal line molecules on the main surface of the liquid crystal layer 42' at the opposite of the alignment layer 16. In the production of a multi-layered circularly-polarized-light-extracting optical element composed of three or more layers, the above procedure may be effected for the second and later liquid crystal layers.

To make the directors on the two main opposite outermost surfaces of the liquid crystal layers 42' and 44' in the circularly-polarized-light-extracting optical element 40' substantially parallel to each other, it is preferable to control the thickness of the liquid crystal layer 44' so that the director in the topmost plane in the liquid crystal layers will be substantially parallel to that in the lowermost plane in the liquid crystal layers, as shown in FIG. 3. By doing so, it is possible to more surely make the directors on the two main outermost surfaces of the liquid crystal layers parallel to each other.

Figure 10A:
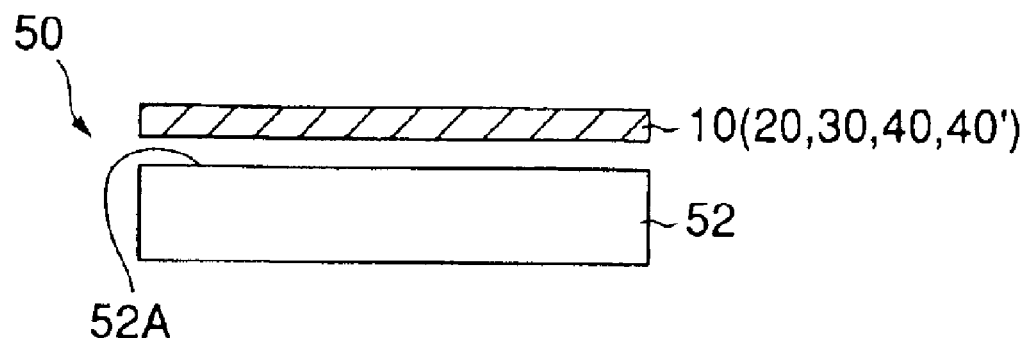
FIG. 10A is a diagrammatical cross-sectional view showing a polarized light source device comprising a circularly-polarized-light-extracting optical element according to the first embodiment of the present invention.

The aforementioned circularly-polarized-light-extracting optical element 10, 20, 30, 40 or 40' according to this embodiment can be used, for instance, in a polarized light source device 50 as shown in FIG. 10A.

As shown in FIG. 10A, in this polarized light source device 50, the circularly-polarized-light-extracting optical element 10 (20, 30, 40 or 40') is arranged on the light-emitting-surface 52A side of a light source 52, so that it can receive light emitted from the light source 52 and can transmit polarized light. The light source 52 is, for example, a flat illuminant and emits non-polarized white light from its light-emitting surface 52A.

Therefore, in this polarized light source device 50, non-polarized light emitted from the light source 52 is polarized by the circularly-polarized-light-extracting optical element, and either right-handed or left-handed circularly polarized component having a wavelength $\lambda 0$ (see the above equation (1)) equal to the helical pitch of the liquid crystal having cholesteric regularity, in the range of a wave bandwidth $\Delta\lambda$ (see the above equation (2)) is reflected; the other circularly polarized component and non-polarized light in a wave range excluding the reflection wave range are transmitted. Right-handed or left-handed circularly polarized component in a specific wave range can thus be obtained. Practically, if non-polarized light in a wave range excluding the wave range of the circularly polarized light transmitted is removed by the use of, for instance, a band pass filter, right-handed or left-handed circularly polarized component in a predetermined wave range can be obtained.

Figure 10B:
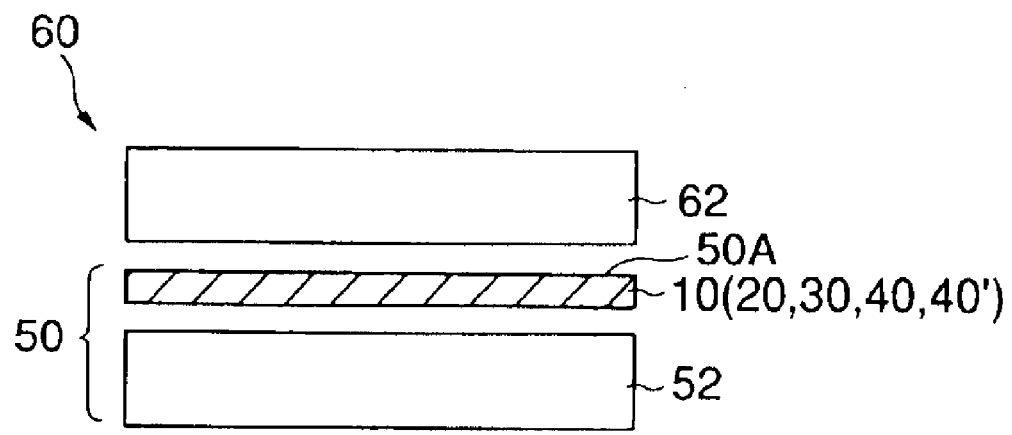
FIG. 10B is a diagrammatical cross-sectional view showing a liquid crystal display comprising a circularly-polarized-light-extracting optical element according to the first embodiment of the present invention.

This polarized light source device 50 can be used, for example, as the light source of a liquid crystal display 60, as shown in FIG. 10B.

As shown in FIG. 10B, this liquid crystal display 60 is composed of a polarized light source device 50 shown in FIG. 10A and a liquid crystal cell 62 that is arranged on the polarized-light-emitting-surface 50A side of the polarized light source device 50 and that receives polarized light emitted from the polarized-light-emitting surface 50A of the polarized light source device 50. The liquid cell 62 is fabricated so that it can transmit polarized incident light in a certain wave range while varying the transmittance for the light according to a voltage applied, for instance, thereby displaying an image or the like.

Second Embodiment

The second embodiment of the present invention will be described by referring to FIG. 11 to FIG. 20B.

Figure 11:
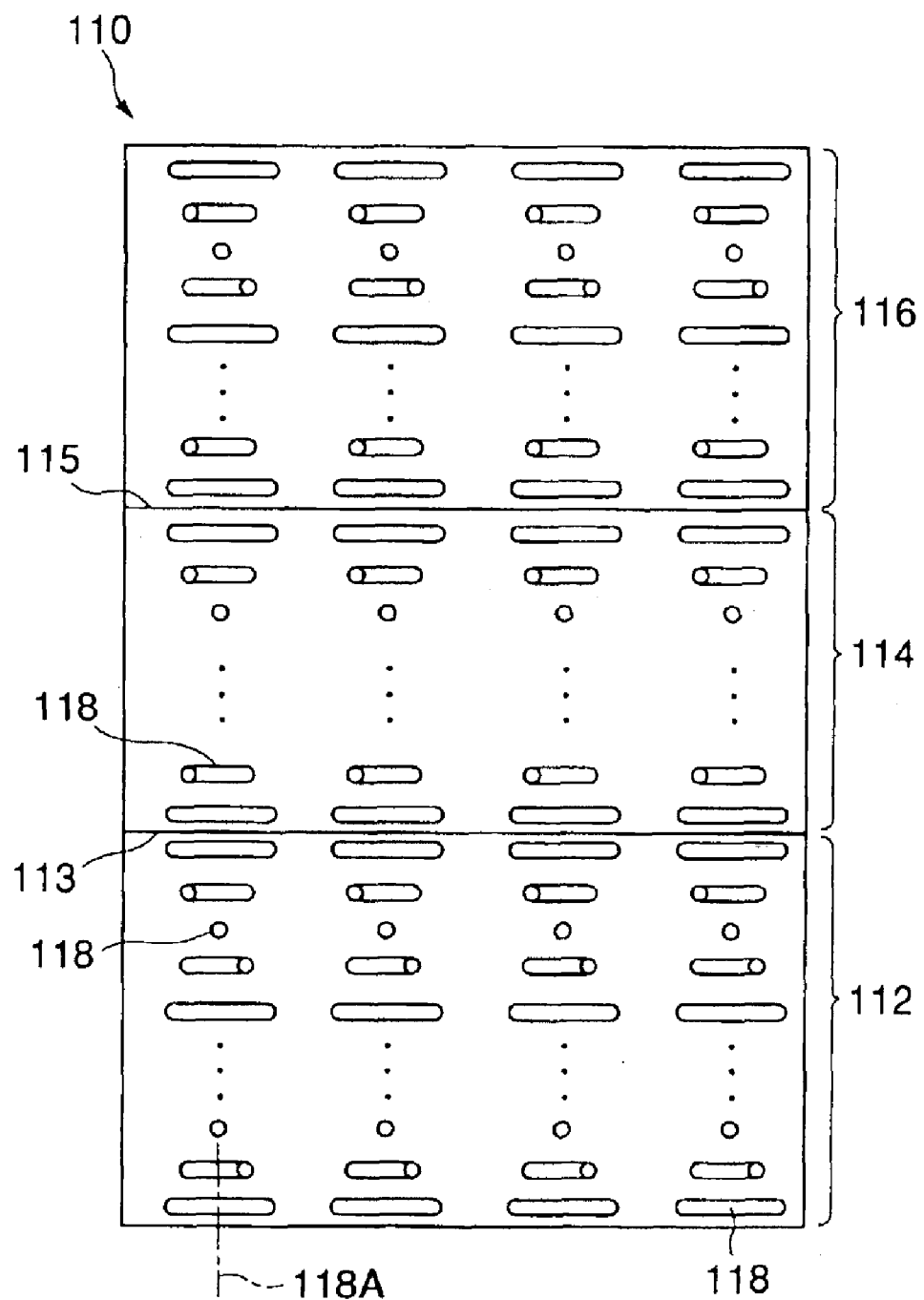
FIG. 11 is an enlarged diagrammatical view showing a circularly-polarized-light-extracting optical element according to the first example of the second embodiment of the present invention.

A circularly-polarized-light-extracting optical element 110 according to the first example of this embodiment will firstly be described by referring to FIG. 11.

As shown in FIG. 11, this circularly-polarized-light-extracting optical element 110 includes a first liquid crystal layer 112, a second liquid crystal layer 114 and a third liquid crystal layer 116, each having cholesteric regularity, wherein these first to third liquid crystal layers 112, 114 and 116 are directly laminated in this order so that the helical axes 118A of liquid crystal line molecules 118 will point in substantially one direction (oriented in the direction of thickness of the liquid crystal layers). As diagrammatically shown in FIGS. 11, 12A and 12B, in the first to third liquid crystal layers 112, 114 and 116, the director D of the liquid crystalline molecules 118 having cholesteric regularity is continuously rotated in the direction of the thickness of the liquid crystal layers to form a helical structure. Further, in the first to third liquid crystal layers 112, 114 and 116, the directors D in planes in the vicinity of the interface of each two neighboring liquid crystal layers (i.e., in the vicinity of the interface 113 of the first liquid crystal layer 112 and the second liquid crystal layer 114, and in the vicinity of the interface 115 of the second liquid crystal layer 114 and the third liquid crystal layer 116) substantially coincide with each other. Cholesteric liquid crystals or chiral nematic liquid crystals having cholesteric regularity, for example, are used as the liquid crystalline molecules 118 in the first to third liquid crystal layers 112, 114 and 116.

The first to third liquid crystal layers 112, 114 and 116 having cholesteric regularity have the rotated-light-selecting property (polarized-light-separating property), that is, the property of separating a component optically rotated (circularly polarized) in one direction from a component optically rotated in the opposite direction according to the physical orientation (planar orientation) of the liquid crystalline molecules in the liquid crystal layer, as described previously in the first embodiment.

Figures 12A, 12B:
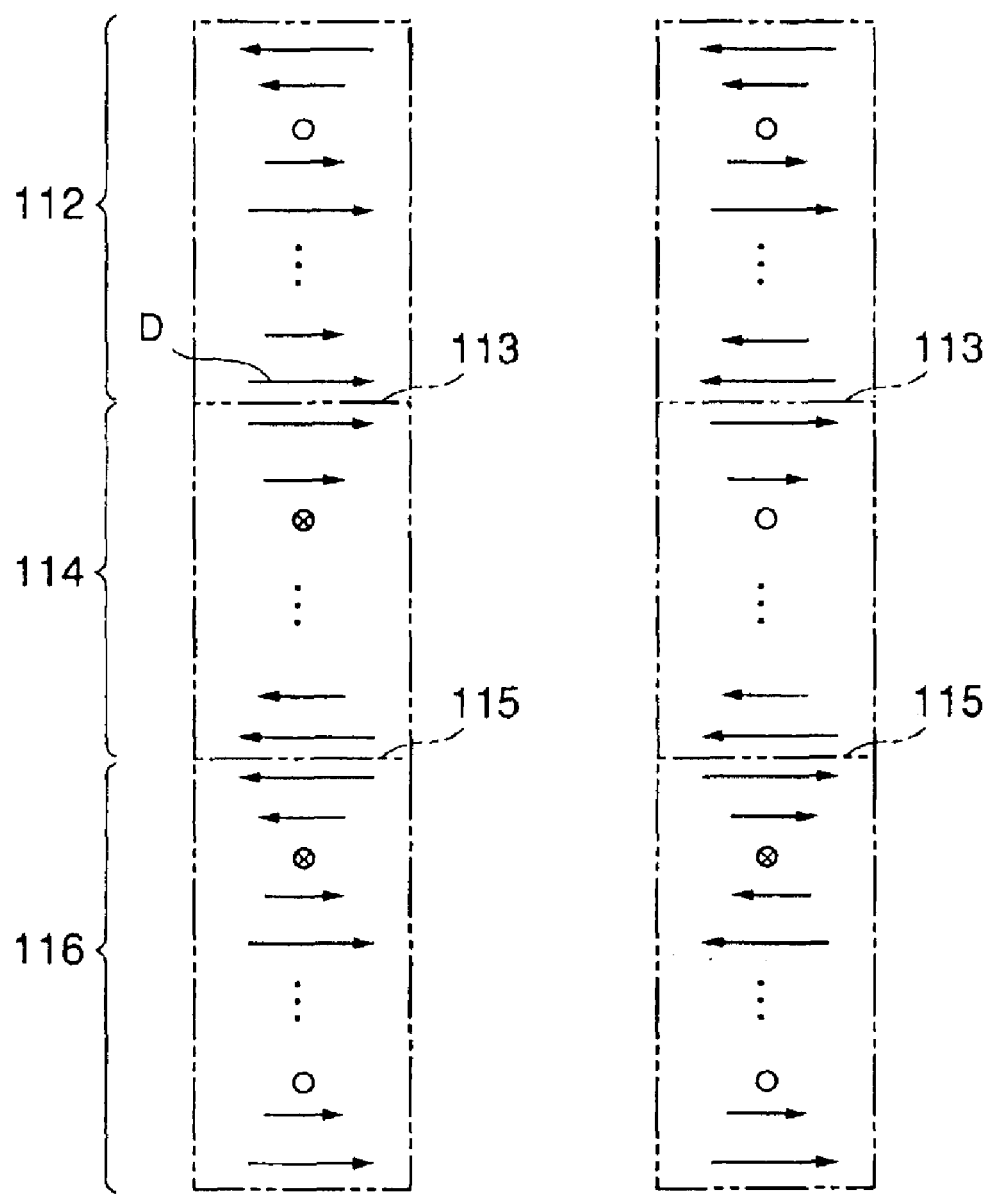
FIGS. 12A and 12B are diagrammatical views showing the directors in the circularly-polarized-light-extracting optical element according to the first example of the second embodiment of the present invention.
Figure 13:
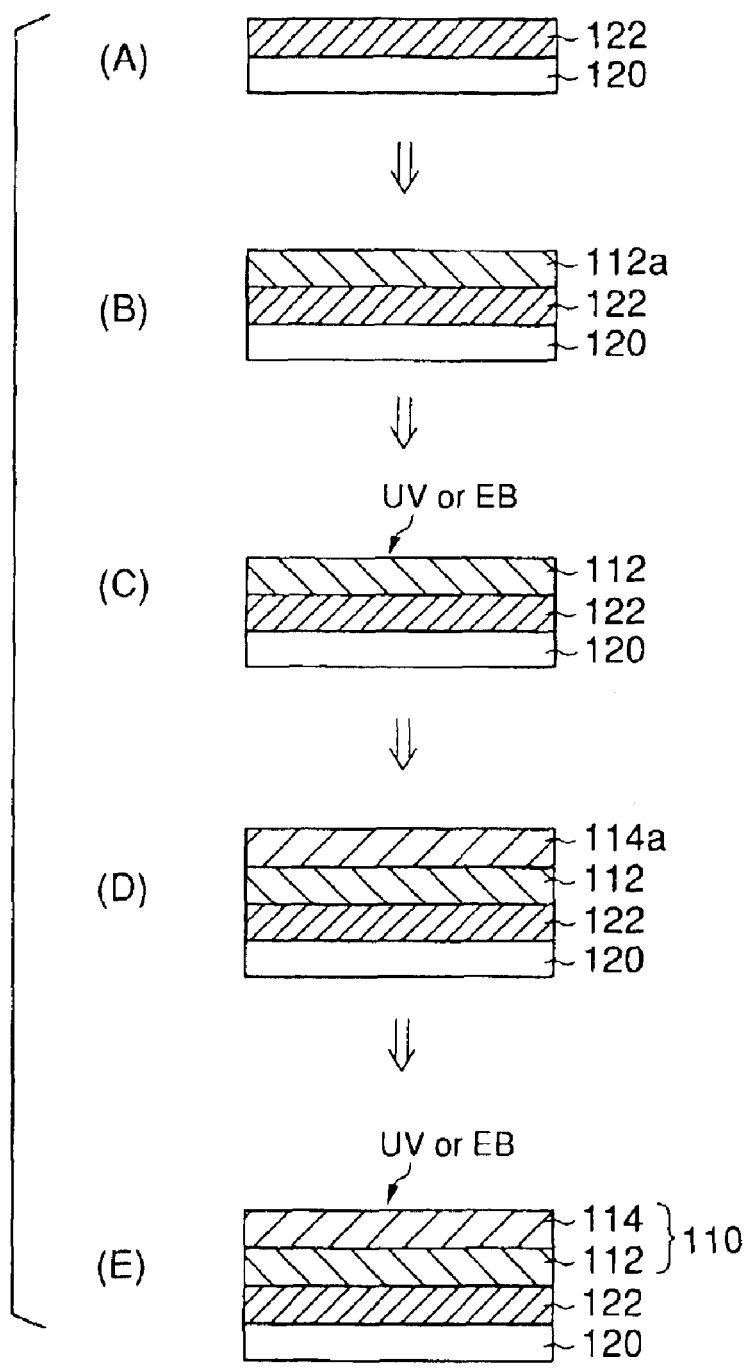
FIG. 13 is a diagrammatical cross-sectional view illustrating a first process of producing a circularly-polarized-light-extracting optical element according to the second embodiment of the present invention.
Figure 14:
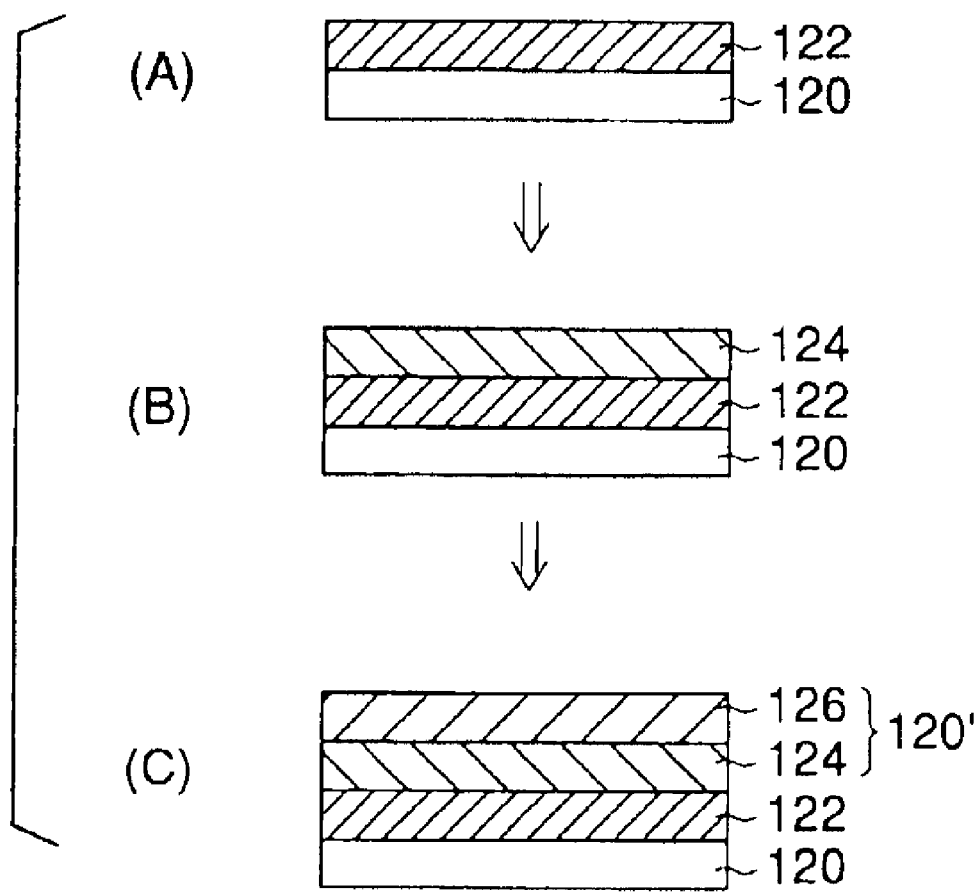
FIG. 14 is a diagrammatical cross-sectional view illustrating a second process of producing a circularly-polarized-light-extracting optical element according to the second embodiment of the present invention.

That the directors D in planes in the vicinity of the interfaces 113 and 115 of each two neighboring liquid crystal layers of the first to third liquid crystal layers 112, 114 and 116 substantially coincide with each other means that the direction in which the liquid crystalline molecules on the both sides of the interface 113 are aligned and that in which the liquid crystalline molecules on the both sides of the interface 115 are aligned are nearly equal to each other as shown in FIG. 12A or that these directions are different from each other by an angle of approximately 180° as shown in FIG. 12B. This is because, in many cases, the head of a liquid crystalline molecule is optically indistinguishable from its tail.

If the directors D in planes in the vicinity of the interfaces 113 and 115 of each two neighboring liquid crystal layers of the first to third liquid crystal layers 112, 114 and 116 substantially coincide with each other, discontinuity is never created in the circularly-polarized-light-reflecting property, which is characteristic of the cholesteric structure, at these interfaces. If the two directors D do not substantially coincide with each other, optical singularity is brought about, and when the spectral transmittance is measured by the use of circularly polarized light, discontinuity was observed in the selective reflection wavelength.

Whether or not the directors D substantially coincide with each other can be known by observing the cross sections of the liquid crystal layers 112, 114 and 116 by a transmission electron microscope. Specifically, when the cross sections of the liquid crystal layers 112, 114 and 116 having cholesteric regularity, in which the liquid crystalline molecules are solidified, are observed by a transmission electron microscope, bright and dark stripes corresponding to the pitch of the molecular helix, characteristic of the cholesteric structure are observed. If the bright and dark stripes that appear on the surface at which two neighboring liquid crystal layers are in contact with each other, that is, the interface of these two liquid crystal layers, are seen uniformly in terms of concentration (brightness), it can be judged that the directors D in planes in the vicinity of the interface of the two neighboring liquid crystal layers substantially coincide with each other.

To form the liquid crystal layers 112, 114 and 116 of the circularly-polarized-light-extracting optical element 110, polymerizable monomers or oligomers that can be three-dimensionally polymerized, as well as liquid crystalline polymers can be used.

Examples of three-dimensionally crosslinkable, polymerizable monomers useful for forming the liquid crystal layers include liquid crystalline monomers and mixtures of chiral compounds as disclosed in Japanese Laid-Open Patent Publication No. 258638/1995 and Published Japanese Translation No. 508882/1998 of PCT International Publication. Examples of polymerizable oligomers that can be used to form the liquid crystal layers include cyclic organopolysiloxane compounds having cholesteric phases as disclosed in Japanese Laid-Open Patent Publication No. 165480/1982. By "three-dimensional crosslinking" is herein meant that polymerizable monomer or oligomer molecules are three-dimensionally polymerized to give a network structure. If such a network structure is formed, the liquid crystalline molecules in the cholesteric liquid crystalline state are optically fixed as they are, and a film that is easy to handle as an optical film and that is stable at normal temperatures can be obtained.

Examples of liquid crystalline polymers useful for forming the liquid crystal layers include polymers having mesogen group, which makes the polymers liquid crystalline, in their main chain or side chains, or both main chain and side chains, polymeric cholesteric liquid crystals having cholesteryl group in their side chains, and liquid crystalline polymers as disclosed in Japanese Laid-Open Patent Publications No. 133810/1997 and No. 293252/1999.

Next, a process of producing the circularly-polarized-light-extracting optical element 110 according to this embodiment, having the above-described constitution will be described hereinafter.

(First Production Process)

First of all, a production process in which polymerizable monomers or oligomers are used for forming liquid crystal layers will be described by referring to FIGS. 13(A) to 13(E).

In this production process, an alignment layer 112 is firstly formed on a glass substrate 120, as shown in FIG. 13(A). Polymerizable monomer molecules (or polymerizable oligomer molecules) 112a are then applied as liquid crystalline molecules to the alignment layer 112, as shown in FIG. 13(B), thereby aligning these molecules by the alignment-regulating action of the alignment layer 112.

Next, polymerization of the polymerizable monomer (or polymerizable oligomer) 112a is initiated with the molecular orientation maintained, by applying ultraviolet light with a photopolymerization initiator in it, or by simply applying an electron beam, as shown in FIG. 13(C), thereby three-dimensionally crosslinking (polymerizing) and solidifying the polymerizable monomer molecules (or polymerizable oligomer molecules) 112a. The polymerizable monomer (or polymerizable oligomer) 112a is thus solidified to give a liquid crystal layer 112.

As shown in FIG. 13(D), another polymerizable monomer (or polymerizable oligomer) 114a prepared separately is then directly applied to the first liquid crystal layer 112 that has been three-dimensionally cross-linked. These liquid crystalline molecules applied are aligned on the surface of the first liquid crystal layer 112 by the alignment-regulating action of the surface of the three-dimensionally cross-linked first liquid crystal layer 112.

In the above process, the mutual interaction between the surface of the three-dimensionally cross-linked liquid crystal layer 112 and the polymerizable monomer molecules (or polymerizable oligomer molecules) 114a, liquid crystalline molecules, used to form a second liquid crystal layer 114 is significant. Namely, it is necessary that, when the liquid crystal line molecules in the first and second liquid crystal layers 112 and 114 come close to each other, the director D in the first liquid crystal layer and the director D in the second liquid crystal layer become substantially equal to each other or become different from each other by an angle of approximately 180°. If the two directors D do not substantially coincide with each other, optical singularity is brought about, and when spectral transmittance is measured by the use of circularly polarized light, discontinuity is observed in the selective reflection wavelength.

Lastly, as shown in FIG. 13(E), the layer of the polymerizable monomer (or polymerizable oligomer) 114a is three-dimensionally crosslinked and is solidified by applying ultraviolet light with a photopolymerization initiator being added, or by simply applying an electron beam, thereby forming a second liquid crystal layer 114. A two-layered circularly-polarized-light-extracting optical element 110 is thus obtained.

To obtain a multi-layered circularly-polarized-light-extracting optical element 110 composed of three or more liquid crystal layers, the above-described steps (FIGS. 13(D) and 13(E)) are repeated to successively laminate liquid crystal layers in the number required.

The polymerizable monomers (or polymerizable oligomers) 112a and 114a may be made into coating liquids by dissolving them in solvents. If such coating liquids are used, it is necessary to add the drying step of evaporating the solvents before the step of three-dimensionally crosslinking the polymerizable monomers (or polymerizable oligomers) 112a and 114a by the application of ultraviolet light or an electron beam.

In the case where the polymerizable monomers (or polymerizable oligomers) 112a and 114a are made into liquid crystal layers at prescribed temperatures, the liquid crystal layers are nematic. If any chiral agent is added to these nematic liquid crystals, chiral nematic liquid crystals (cholesteric liquid crystals) can be obtained. Specifically, it is preferable to add a chiral agent to the polymerizable monomer or oligomer in an amount of several to 10%. By varying the chiral power by changing the type of the chiral agent to be added, or by varying the concentration of the chiral agent, it is possible to control the selective reflection wave range, which is determined by the cholesteric structure of the polymerizable monomer or oligomer.

The alignment layer 122 can be formed by a conventionally known method. For example, the alignment layer may be formed by a method in which a polyimide film is formed on the glass substrate 120 and is then rubbed as described above, or a method in which the glass substrate 120 is covered with a polymeric compound film that will become an optical alignment layer and polarized UV (ultraviolet light) is applied to this film. An oriented PET (polyethylene terephthalate) film or the like may also be used to obtain the alignment layer.

Further, it is also possible to use a light-transmitting substrate instead of the glass substrate 120. In this case, there may be used a sheet- or plate-like flat member made from a light-transmitting material selected from homopolymers or copolymers of acrylic or methacrylic esters such as polymethyl methacrylate and polymethyl acrylate, polyesters such as polyethylene terephthalate, transparent resins such as polycarbonate and polyethylene, and transparent ceramics.

(Second Production Process)

Next, a production process in which liquid crystalline polymers are used to form liquid crystal layers will be described by referring to FIGS. 14(A) to 14(C).

In this production process, an alignment layer 122 is firstly formed on a glass substrate 120, as shown in FIG. 14(A), like in the aforementioned first production process.

As shown in FIG. 14(B), a liquid crystalline polymer having cholesteric regularity is applied to the alignment layer 122 and is oriented by the alignment-regulating action of the alignment layer 122. This liquid crystalline polymer is then cooled to a temperature equal to or lower than its glass transition temperature (Tg); the polymer is thus transformed into the glassy state to give a first liquid crystal layer 124.

Thereafter, as shown in FIG. 14(C), another liquid crystalline polymer having cholesteric regularity, separately prepared, is directly applied to the first liquid crystal layer 124 and is oriented by the alignment-regulating action of the surface of the first liquid crystal layer 124 in the glassy state.

In the above process, the mutual interaction between the surface of the liquid crystal layer 124 in the glassy state and the liquid crystalline polymer used for forming a second liquid crystal layer 126 is significant. Namely, it is necessary that the director D in the first liquid crystal layer 124 and the director D in the second liquid crystal layer 126 become substantially equal to each other or become different from each other by an angle of approximately 180° when the liquid crystal line molecules in the two liquid crystal layers come close to each other. When the two directors D do not substantially coincide with each other, optical singularity is brought about, and discontinuity is observed in the selective reflection wavelength when spectral transmittance is measured by the use of circularly polarized light.

Lastly, the liquid crystalline polymer is cooled to a temperature equal to or lower than its glass transition temperature (Tg) to transform it into the glassy state in the manner as described above, thereby forming a second liquid crystal layer 126. Thus, a two-layered circularly-polarized-light-extracting optical element 120' is obtained.

To obtain a multi-layered circularly-polarized-light-extracting optical element composed of three or more liquid crystal layers, the above-described step (FIG. 14(C)) is repeated to successively laminate liquid crystal layers in the number required.

In this production process, the liquid crystalline polymers may be made into coating liquids by dissolving them in solvents. If such coating liquids are used, it is necessary to add, before the cooling step, the drying step of evaporating the solvents.

There may be used, as the liquid crystalline polymers, cholesteric liquid crystalline polymers themselves having chirality, or mixtures of nematic liquid crystalline polymers and cholesteric liquid crystalline polymers.

The state of such liquid crystalline polymers changes with temperature. For example, a liquid crystalline polymer having a glass transition temperature of 90° C. and an isotropic transition temperature of 200° C. is in the state of cholesteric liquid crystal at a temperature between 90° C. and 200° C.; if this polymer is cooled to room temperature, it is solidified to the glassy state with its cholesteric structure maintained.

If a cholesteric liquid crystalline polymer is used, the chiral power in the liquid crystalline polymer may be adjusted by any known method to control the incident light selective reflection wave range, which is determined by the cholesteric structure of the liquid crystalline polymer. If a mixture of a nematic liquid crystalline polymer and a cholesteric liquid crystalline polymer is used, the mixing ratio of these two polymers may be adjusted for this purpose.

When coating a liquid crystal layer that has been solidified into the glassy state with another liquid crystalline polymer and aligning it, it is necessary to conduct heating. When the first and second liquid crystal layers 124 and 126 are heated for this purpose, they are intermingled if they have substantially the same glass transition temperature and substantially the same isotropic transition temperature. It is therefore preferable to make the glass transition temperatures and the isotropic transition temperatures of the two liquid crystal layers slightly different from each other.

Next, by referring to FIG. 15, a circularly-polarized-light-extracting optical element 130 according to the second example of this embodiment will be described.

Figure 15:
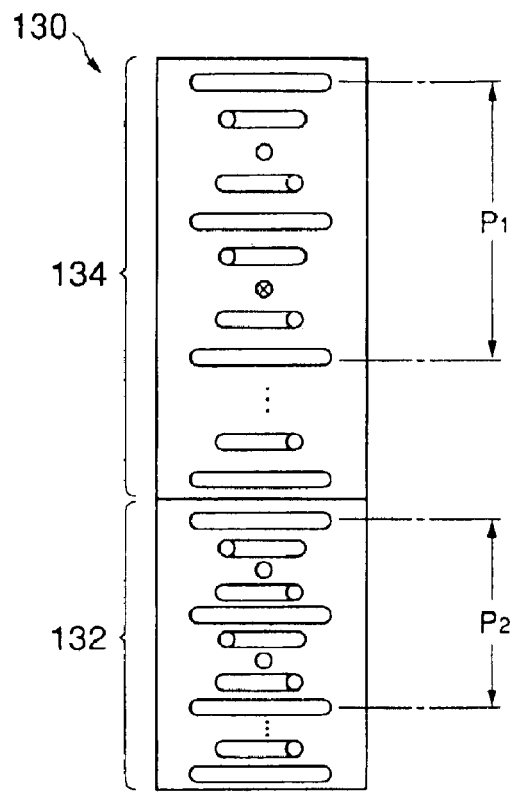
FIG. 15 is an enlarged diagrammatical view showing an essential part of the circularly-polarized-light-extracting optical element according to the second example of the second embodiment of the present invention.

In the circularly-polarized-light-extracting optical element 130, the pitch $p1$ of the molecular helix in the first liquid crystal layer 132 formed in the above-described manner and the pitch $p2$ of the molecular helix in the second liquid crystal layer 134 formed in the above-described manner are different from each other, as shown in FIG. 15.

The pitch of the molecular helix herein means the distance $p1$ or $p2$ it takes for the director to rotate through 360° about the central axis (helical axis) of the molecular helix (see FIG. 15).

If the liquid crystal layers 132 and 134 are made different in the pitch of the molecular helix, the resulting circularly-polarized-light-extracting optical element can extract circularly polarized light having different wavelengths; this means that the waveband width is increased.

Next, by referring to FIG. 16, a circularly-polarized-light-extracting optical element 140 according to the third example of this embodiment will be described.

Figure 16:
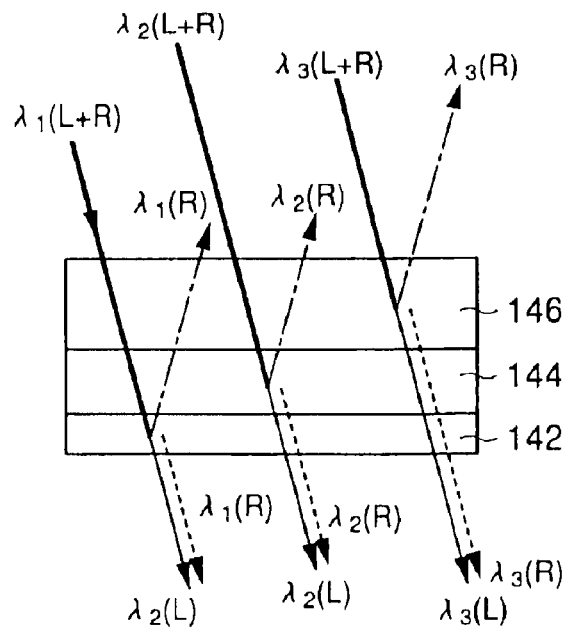
FIG. 16 is an enlarged diagrammatical cross-sectional view showing a circularly-polarized-light-extracting optical element according to the third example of the second embodiment of the present invention.

As shown in FIG. 16, this circularly-polarized-light-extracting optical element 140 comprises three layers of first to third liquid crystal layers 142, 144 and 146 laminated in the manner as described above. These liquid crystal layers 142, 144 and 146 are different in the pitch of the molecular helix, so that they reflect circularly polarized light having different wavelengths $\lambda 1$, $\lambda 2$ and $\lambda 3$.

FIG. 16 shows the following case: the directions of rotation of the liquid crystalline molecules in the respective liquid crystal layers 142, 144 and 146 are the same, and the liquid crystal layers 142, 144 and 146 reflect a part of right-handed circularly polarized component R and transmit left-handed circularly polarized component L.

For instance, if the thickness required for a liquid crystal layer to reflect a circularly polarized component with a maximum reflectance is equivalent to 8 pitches of the molecular helix, each liquid crystal layer 142, 144 or 146 is made to have a thickness smaller than this, equivalent to 6.4 pitches. Namely, the thickness of each liquid crystal layer 142, 144 or 146 is made smaller than the thickness required for the liquid crystal layer to reflect, with a maximum reflectance, either right-handed or left-handed circularly polarized component of light having a specific wavelength, contained in incident light.

Non-polarized light incident on such liquid crystal layers 142, 144 and 146 having cholesteric regularity is polarized, and, according to the previously mentioned property of separating polarized light, either right-handed or left-handed circularly polarized component of light in a wave range with a center wavelength of $\lambda 0$, having a waveband width of $\Delta\lambda$ is reflected, and the other circularly polarized component and light (non-polarized light) in a wave rage excluding the reflection wave range are transmitted. The right-handed or left-handed circularly polarized component is reflected without undergoing phase inversion unlike in the case of ordinary reflection of light.

To reflect either right-handed or left-handed circularly polarized component with a maximum reflectance (generally from 95 to 99%) and to transmit the other component, a liquid crystal layer is generally required to have a thickness equivalent to at least 8 pitches of the molecular helix.

The thickness of each liquid crystal layer 142, 144 or 146 shown in FIG. 16 is, however, equivalent to 6.4 pitches, which is smaller than the above-described pitches required.

It is therefore possible to make each liquid crystal layer reflect 80% of either right-handed or left-handed circularly polarized component and transmit 20% of the same in the above-described range of waveband width $\Delta\lambda$. With respect to the other circularly polarized component, each liquid crystal layer transmits this component with a transmittance of nearly 100%, higher than the transmittance attained by a liquid crystal layer whose thickness is equivalent to 8 pitches of the molecular helix.

Further, for example, if the thickness of each liquid crystal layer 142, 144 or 146 is made equivalent to 5.6 pitches, it is possible to make each liquid crystal layer reflect 70% of either right-handed or left-handed circularly polarized component and transmit 30% of the same. Namely, reflectance and transmittance in any percentages of the maximum reflectance can be obtained by changing the number of turns of the molecular helix in each liquid crystal layer 142, 144 or 146.

Furthermore, to reflect either right-handed or left-handed circularly polarized component with a maximum reflectance (generally from 95 to 99%) and to transmit the other component, a liquid crystal layer is generally required to have a thickness of at least 1.6 μm for visible light having a wavelength of 380 nm and a thickness of at least 3.3 μm for visible light having a wavelength of 780 nm.

On the contrary, each liquid crystal layer 142, 144 or 146 shown in FIG. 16 is made to have a thickness ranging from 1.24 μm (380 nm) to 2.6 μm (780 nm) (the thickness of each liquid crystal layer is linearly varied with the selective reflection wavelength), which is smaller than the above-described thickness required.

Therefore, in the above-described range of waveband width Δλ, it is possible to make each liquid crystal layer reflect 80% of either right-handed or left-handed circularly polarized component and transmit 20% of the same. With respect to the other circularly polarized component, each liquid crystal layer transmits the component with a transmittance of nearly 100%, higher than the transmittance attained by a liquid crystal layer having a thickness of 5 μm.

If the thickness of each liquid crystal layer 142, 144 or 146 is made, for example, from 1.1 μm (380 nm) to 2.3 μm (780 nm) (the thickness of each liquid crystal layer is linearly varied with the selective reflection wavelength), it is possible to make the liquid crystal layer reflect 70% of either right-handed or left-handed circularly polarized component and transmit 30% of the same. Namely, reflectance and transmittance in any percentages of the maximum reflectance can be obtained by changing the thickness of each liquid crystal layer 142, 144 or 146.

In addition, since the thickness of each liquid crystal layer in the circularly-polarized-light-extracting optical element 160 is made smaller than the thickness required for the liquid crystal layer to reflect, with a maximum reflectance, either right-handed or left-handed circularly polarized component, the same circularly polarized light component as reflected light can be obtained even from light entering the liquid crystal layer from the side opposite to incident light that will be reflected and outgoing from the liquid crystal layer.

In the circularly-polarized-light-extracting optical element 140 shown in FIG. 16, the first to third liquid crystal layers 142, 144 and 146 reflect light having different wavelengths. The embodiment, however, is not limited to this.

Figure 17:
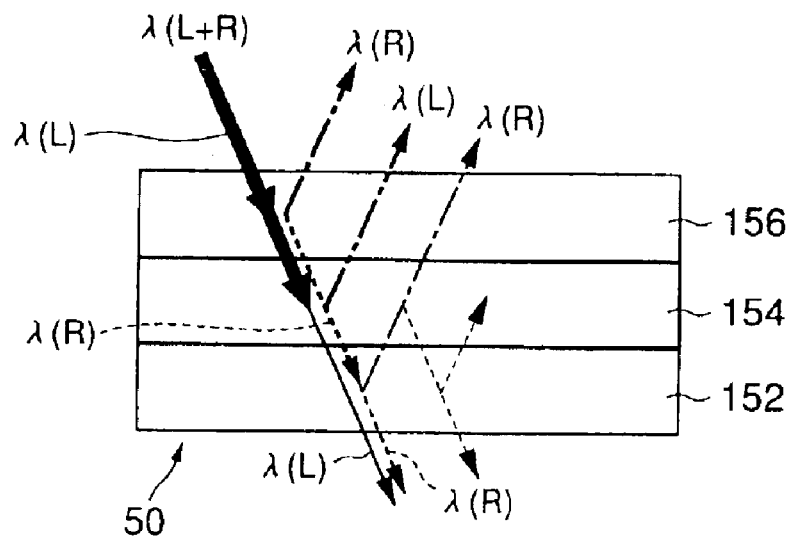
FIG. 17 is an enlarged diagrammatical cross-sectional view showing a circularly-polarized-light-extracting optical element according to the fourth example of the second embodiment of the present invention.

Specifically, like a circularly-polarized-light-extracting optical element 150 according to the fourth example of this embodiment as shown in FIG. 17, for example, first to third liquid crystal layers 152, 154 and 156 may be made so that they reflect light having the same wavelength. In this circularly-polarized-light-extracting optical element 150, the second liquid crystal layer 154 reflects a part of left-handed circularly polarized component L; this liquid crystal layer is different, in this respect, from the first and third liquid crystal layers 152 and 156 which reflect a part of right-handed circularly polarized component R.

By providing such liquid crystal layers, right-handed and left-handed circularly polarized components in a specific wave range can be simultaneously extracted in any percentages.

Next, a circularly-polarized-light-extracting optical element 160 according to the fifth example of this embodiment will be described by referring to FIG. 18.

Figure 18:
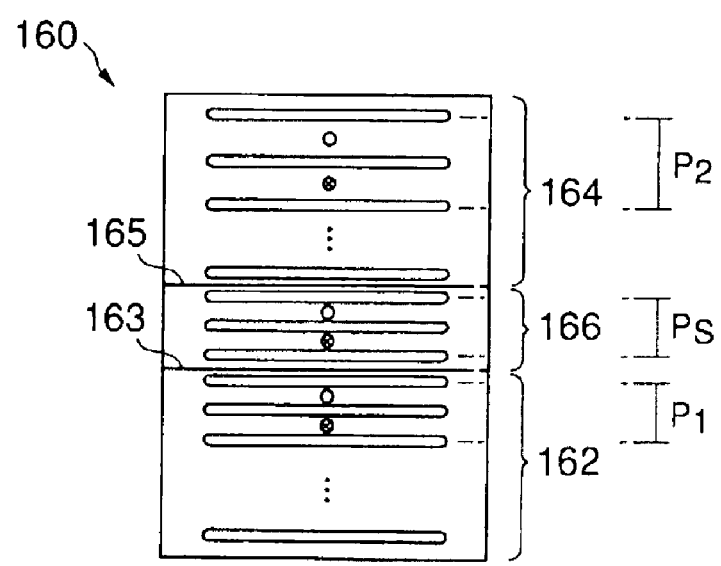
FIG. 18 is an enlarged diagrammatical view showing an essential part of the circularly-polarized-light-extracting optical element according to the fifth example of the second embodiment of the present invention.

As shown in FIG. 18, this circularly-polarized-light-extracting optical element 160 comprises a transition liquid crystal layer 166 provided between a first liquid crystal layer 162 and a second liquid crystal layer 164, the pitch of the molecular helix in the first liquid crystal layer 162 being different from that of the molecular helix in the second liquid crystal layer 164.

In this circularly-polarized-light-extracting optical element 160, the pitch p1 of the molecular helix in the first liquid crystal layer 162, the pitch p2 of the molecular helix in the second liquid crystal layer 164 and the pitch ps of the molecular helix in the transition liquid crystal layer 166 are made to fulfil the following conditions: p1<p2, and p1≦ps≦p2.

Namely, the pitch ps of the molecular helix in the transition liquid crystal layer 166 is varied in the direction of thickness so that, at the interface 163 of the first liquid crystal layer 162 and the transition liquid crystal layer 166, ps will be equal to p1 and that, at the interface 165 of the second liquid crystal layer 164 and the transition liquid crystal layer 166, ps will be equal to p2. Specifically, the first liquid crystal layer 162 is allowed to slightly melt when it is coated with the second liquid crystal layer 164. By doing so, it becomes possible to extract circularly polarized light in a continuously broadened wave range.

Figure 19:
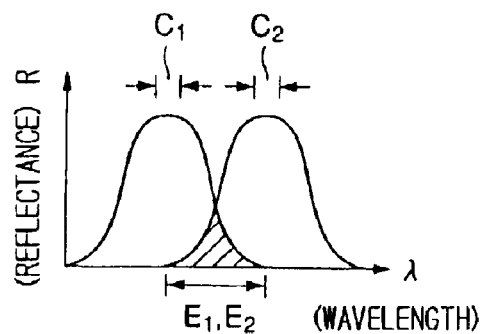
FIG. 19 is a graph showing the selective reflection wave range of the circularly-polarized-light-extracting optical element according to the second example of the second embodiment of the present invention.

In the case where liquid crystal layers having different pitches are laminated like in the case of the circularly-polarized-light-extracting optical element 130 shown in FIG. 15, it is preferable to make the selective reflection wave ranges of at least two liquid crystal layers partially overlapped, as shown in FIG. 19. Namely, it is preferable to make at least two of the liquid crystal layers laminated have selective reflection wave ranges whose center regions C1 and C2 do not coincide with each other and whose end regions E1 and E2 are partially overlapped. By doing so, it becomes possible to extract circularly polarized light in a continuously broadened wave range.

Figure 20A:
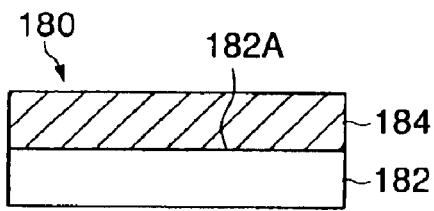
FIG. 20A is a diagrammatical cross-sectional view showing a polarized light source device comprising the circularly-polarized-light-extracting optical element according to the second embodiment of the present invention.

The aforementioned circularly-polarized-light-extracting optical element 110, 130, 140, 150 or 160 according to this embodiment can be used in a polarized light source device 180 as shown in FIG. 20A, for example.

As shown in FIG. 20A, in this polarized light source device 180, the circularly-polarized-light-extracting optical element 184 (110, 130, 140, 150 or 160) is arranged on the light-emitting-surface 182A side of a light source 182, so that it can receive light emitted from the light source 182 and can transmit polarized light. The light source 182 is, for example, a flat illuminant and emits non-polarized white light from its light-emitting surface 182A.

Therefore, in this polarized light source device 180, non-polarized light emitted from the light source 182 is polarized by the circularly-polarized-light-extracting optical element, and either right-handed or left-handed circularly polarized component having a wavelength λ0 (see the above equation (1)) equal to the helical pitch of the liquid crystal having cholesteric regularity, in the range of waveband width Δλ (see the above equation (2)) is reflected; the other circularly polarized component and non-polarized light in a wave range excluding the reflection wave range are transmitted. Right-handed or left-handed circularly polarized component in a specific wave range can thus be obtained. Practically, if non-polarized light in a wave range excluding the wave range of the circularly polarized light transmitted is removed by the use of, for instance, a band pass filter, right-handed or left-handed circularly polarized component in a predetermined wave range can be obtained.

Figure 20B:
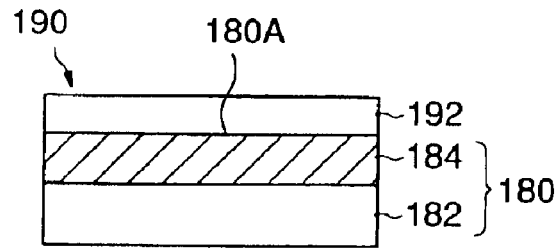
FIG. 20B is a diagrammatical cross-sectional view showing a liquid crystal display comprising the circularly-polarized-light-extracting optical element according to the second embodiment of the present invention.

This polarized light source device 180 can be used, for example, as the light source of a liquid crystal display 190 as shown in FIG. 20B.

As shown in FIG. 20B, this liquid crystal display 190 is composed of a polarized light source device 180 shown in FIG. 20A and a liquid crystal cell 192 that is arranged on the polarized-light-emitting-surface 180A side of the polarized light source device 180 and that receives polarized light emitted from the polarized-light-emitting surface 180A of the polarized light source device 180. The liquid cell 192 is fabricated so that it can transmit polarized incident light in a certain wave range while varying the transmittance for the light according to, for instance, a voltage applied, thereby displaying an image or the like.

EXAMPLES

First Examples

The aforementioned first embodiment of the invention will be explained by referring to the following Examples and Comparative Examples.

Example 1-1

In Example 1-1, a single liquid crystal layer was made from a polymerizable monomer, where the thickness of the liquid crystal layer was made uniform to orient the liquid crystalline molecules in one direction.

90 parts of a monomer containing, in its molecule, polymerizable acrylates at both ends and spacers between mesogen existing at the center and the acrylates, having a nematic-isotropic transition temperature of 110° C., and 10 parts of a chiral gent having, in its molecule, polymerizable acrylates at both ends were dissolved in toluene. To this toluene solution was added a photopolymerization initiator in an amount of 5% by weight of the above monomer. (With respect to the chiral nematic liquid crystal thus obtained, it was confirmed that the liquid crystalline molecules would be oriented on an alignment layer in one direction that was the direction, in which the alignment layer had been rubbed, ±5 degrees.)

Separately, a transparent glass substrate was spin-coated with polyimide dissolved in a solvent. After drying, a film of the polyimide was formed at 200° C. (film thickness 0.1 $\mu$m) and was rubbed in a definite direction so that this film would function as an alignment layer.

The glass substrate provided with this alignment layer was set in a spin-coater; and the alignment layer was spin-coated with the above-prepared toluene solution under such conditions that the thickness of the resulting film would be as uniform as possible.

The toluene contained in the toluene solution applied was then evaporated at 80° C. to form a coating film on the alignment layer. It was visually confirmed by way of selective reflection of light that this coating film was cholesteric.

Ultraviolet light was applied to the above coating film to cause the photopolymerization initiator contained in the coating film to generate radicals, by which the acrylates in the monomer molecules were polymerized by three-dimensional crosslinking, thereby obtaining a single-layered circularly-polarized-light-extracting optical element. The thickness of the coating film was 2 $\mu$m±1.5%. By the measurement made by using a spectrophotometer, it was confirmed that the center wavelength of the selective reflection wave range of the coating film was 600 nm.

Figure 21:
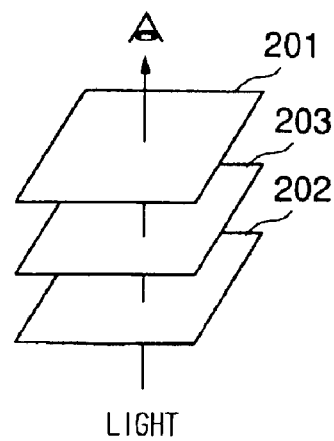
FIG. 21 is an exploded diagrammatical perspective view showing the arrangement of a circularly-polarized-light-extracting optical element at the time when the circularly-polarized-light-extracting optical element is observed by placing it between two polarizers.

Further, the circularly-polarized-light-extracting optical element thus obtained was placed between two circular polarizers arranged in the cross nicol disposition, as shown in FIG. 21, and was visually observed. The bright and darks stripes observed on the displaying area were very few.

Comparative Example 1-1

In Comparative Example 1-1, a single liquid crystal layer was made from a polymerizable monomer, where the thickness of the liquid crystal layer was made non-uniform to cause the liquid crystalline molecules to point in different directions. Namely, a circularly-polarized-light-extracting optical element was produced in the same manner as in Example 1-1, provided that the thickness of the coating film was made 2 $\mu$m±5% by changing the conditions under which spin coating was conducted. This circularly-polarized-light-extracting optical element was observed in the same manner as in Example 1-1. As a result, it was found that bright and dark stripes clearly appeared on the displaying area.

Comparative Example 1-2

In Comparative Example 1-2, a single liquid crystal layer was formed by using a polymerizable monomer on an alignment layer that had been rubbed in not one direction, thereby causing the liquid crystalline molecules to point in different directions. Namely, a circularly-polarized-light-extracting optical element was produced in the same manner as in Example 1-1, provided that the alignment layer was rubbed in a random fashion. This circularly-polarized-light-extracting optical element was observed in the same manner as in Example 1-1. As a result, it was found that bright and dark stripes clearly appeared on the displaying area.

Example 1-2

In Example 1-2, a single liquid crystal layer was made from a polymerizable monomer, where the thickness of the liquid crystal layer was made uniform and the pitch of the molecular helix was adjusted so that the directors on the two main opposite surfaces of the liquid crystal layer would be parallel to each other. Namely, a circularly-polarized-light-extracting optical element was produced in the same manner as in Example 1-1, provided that the liquid crystal layer was made, by making use of the refractive index of the material used for forming the liquid crystal layer, to have such a thickness that the director at the starting point of the cholesteric structure would be parallel to the director at the end point of the cholesteric structure. This circularly-polarized-light-extracting optical element was observed in the same manner as in Example 1-1. As a result, it was obvious that the bright and dark stripes observed on the displaying area were fewer than those stripes that appeared when a liquid crystal layer formed without controlling thickness and helical pitch as described above was used.

Example 1-3

In Example 1-3, a plurality of liquid crystal layers were made from a polymerizable monomer, where the total thickness of the liquid crystal layers was made uniform to orient the liquid crystalline molecules in one direction.

The circularly-polarized-light-extracting optical element produced in Example 1-1 was used as a first liquid crystal layer. The surface of this first liquid crystal layer at the opposite of the alignment layer was spin-coated, at a number of revolutions greater than before, with the same toluene solution as that used in Example 1-1 except that the amount of the chiral agent was 15 parts.

Next, the toluene contained in the toluene solution was evaporated at 80° C. to form a coating film on the first liquid crystal layer. It was visually confirmed by way of selective reflection of light that this coating film was cholesteric. By the measurement made by using a spectrophotometer, it was confirmed that the center wavelength of the selective reflection wave range of this coating film was approximately 500 nm.

Ultraviolet light was applied to the above coating film to cause the photopolymerization initiator contained in the coating film to generate radicals, by which the acrylates in the monomer molecules were polymerized by three-dimensional crosslinking to form a second liquid crystal layer. A multi-layered circularly-polarized-light-extracting optical element was thus obtained. The total thickness of this optical element was found to be 3.5 $\mu$m±1.5%.

The cross section of this multi-layered circularly-polarized-light-extracting optical element was observed by a transmission electron microscope. As a result, it was found the following: the bright and dark stripes that appeared between the polymerized liquid crystal layers were parallel to each other (from this, it can be known that the directions of the helical axes of the liquid crystalline molecules in the liquid crystal layers are the same); and no discontinuity was present between the liquid crystal layers (from this, it can be known that the directors in planes in the vicinity of the interface of the two neighboring liquid crystal layers coincide with each other).

Further, the circularly-polarized-light-extracting optical element was placed between two circular polarizers arranged in the cross nicol disposition, as shown in FIG. 21, and was visually observed. The bright and dark stripes observed on the displaying area were very few.

Comparative Example 1-3

In Comparative Example 1-3, a plurality of liquid crystal layers were made from a polymerizable monomer, where the total thickness of the liquid crystal layers was made non-uniform to cause the liquid crystal line molecules to point in different directions. Namely, a circularly-polarized-light-extracting optical element was produced in the same manner as in Example 1-3, provided that the total thickness of the liquid crystal layers was made 3.5 $\mu$m±5% by changing the conditions under which spin coating was conducted. This circularly-polarized-light-extracting optical element was observed in the same manner as in Example 1-3. As a result, it was found that bright and dark stripes clearly appeared on the displaying area.

Example 1-4

In Example 1-4, a plurality of liquid crystal layers were made from liquid crystalline polymers, where the total thickness of the liquid crystal layers were made uniform to orient the liquid crystalline molecules in one direction.

A toluene solution was prepared by dissolving, in toluene, a liquid crystalline polymer containing acrylic side chains, having a glass transition temperature of 80° C. and an isotropic transition temperature of 200° C. (With respect to the polymeric cholesteric liquid crystal thus obtained, it was confirmed that the molecules would be oriented on an alignment layer in one direction that was the direction, in which the alignment layer had been rubbed, ±5 degrees.)

Separately, a transparent glass substrate was spin-coated with polyimide dissolved in a solvent. After drying, a film of the polyimide was formed at 200° C. (film thickness 0.1 $\mu$m) and was rubbed in a definite direction so that this film would function as an alignment layer.

The glass substrate provided with this alignment layer was set in a spin-coater; and the alignment layer was spin-coated with the above-prepared toluene solution under such conditions that the resulting film would be as uniform as possible.

The toluene contained in the toluene solution applied was then evaporated at 90° C. to form, on the alignment layer, a coating film, which was held at 150° C. for 10 minutes. It was visually confirmed by way of selective reflection of light that this coating film was cholesteric. The coating film was cooled to room temperature to transform the liquid crystalline polymer into the glassy state and to fix the liquid crystalline polymer in this state, thereby forming a first liquid crystal layer. The thickness of the first liquid crystal layer was 2 $\mu$m±1.5%. By the measurement made by using a spectrophotometer, it was confirmed that the center wavelength of the selective reflection wave range of the first liquid crystal layer was 600 nm.

Further, the first liquid crystal layer in the glassy state was spin-coated, at a number of revolutions greater than before, with a toluene solution prepared by dissolving, in toluene, a liquid crystalline polymer containing acrylic side chains, having a glass transition temperature of 75° C. and an isotropic transition temperature of 190° C.

Next, the toluene contained in the toluene solution was evaporated at 80° C. to form a coating film on the first liquid crystal layer. It was visually confirmed by way of selective reflection of light that this coating film was cholesteric. By the measurement made by using a spectrophotometer, it was confirmed that the center wavelength of the selective reflection wave range of the coating film was approximately 500 nm.

Thereafter, the toluene contained in the toluene solution applied was evaporated at 90° C.; and the coating film was held at 150° C. for 10 minutes. It was visually confirmed by way of selective reflection of light that this coating film was cholesteric. The coating film was cooled to room temperature to transform the liquid crystalline polymer into the glassy state and to fix the liquid crystalline polymer in this state, thereby forming a second liquid crystal layer. A multi-layered circularly-polarized-light-extracting optical element was thus obtained. The total thickness of this circularly-polarized-light-extracting optical element was 3.5 $\mu$m±1.5%.

The cross section of this multi-layered circularly-polarized-light-extracting optical element was observed by a transmission electron microscope. As a result, it was found the following: the bright and dark stripes that appeared between the solidified liquid crystal layers were parallel to each other (from this, it can be known that the directions of the helical axes of the liquid crystalline molecules in the liquid crystal layers are the same); and no discontinuity was present between the liquid crystal layers (from this, it can be known that the directors in planes in the vicinity of the interface of the two neighboring liquid crystal layers coincide with each other). In the measurement made by using a spectrophotometer, no optical singularity was observed in the transmittance.

Further, the circularly-polarized-light-extracting optical element thus obtained was placed between two circular polarizers arranged in the cross nicol disposition, as shown in FIG. 21, and was visually observed. The bright and dark stripes observed on the displaying area were very few.

Comparative Example 1-4

In Comparative Example 1-4, a plurality of liquid crystal layers were made from liquid crystalline polymers, where the total thickness of the liquid crystal layers was made non-uniform to cause the liquid crystalline molecules to point in various directions. Namely, a circularly-polarized-light-extracting optical element was produced in the same manner as in Example 1-4, provided that the total thickness of the liquid crystal layers was made 3.5 μm±5% by changing the conditions under which spin coating was conducted. This multi-layered circularly-polarized-light-extracting optical element was observed in the same manner as in Example 1-4. As a result, it was found that bright and dark stripes clearly appeared on the displaying area.

Second Examples

The second embodiment of the present invention will now be explained by referring to the following Examples and Comparative Example.

Example 2-1

In Example 2-1, a plurality of liquid crystal layers were made from a polymerizable monomer, where the directors in planes in the vicinity of the interface of each two neighboring liquid crystals were made to coincide with each other by rubbing process.

90 parts of a monomer containing, in its molecule, polymerizable acrylates at both ends and spacers between mesogen existing at the center and the acrylates, having a nematic-isotropic transition temperature of 110° C., and 10 parts of a chiral gent having, in its molecule, polymerizable acrylates at both ends were dissolved in toluene. To this toluene solution was added a photopolymerization initiator in an amount of 5% by weight of the above monomer. (With respect to the chiral nematic liquid crystal thus obtained, it was confirmed that the liquid crystalline molecules would be oriented on an alignment layer in one direction that was the direction in which the alignment layer had been rubbed ±5degrees.)

Separately, a transparent glass substrate was spin-coated with polyimide dissolved in a solvent. After drying, a film of the polyimide was formed at 200° C. (film thickness 0.1 μm) and was rubbed in a definite direction so that this film would function as an alignment layer.

The glass substrate provided with this alignment layer was set in a spin-coater; and the alignment layer was spin-coated with the above-prepared toluene solution.

The toluene contained in the toluene solution applied was then evaporated at 80° C. to form a coating film on the alignment layer. It was visually confirmed by way of selective reflection of light that this coating film was cholesteric.

Ultraviolet light was applied to the above coating film to cause the photopolymerization initiator contained in the coating film to generate radicals, by which the acrylates in the monomer molecules were polymerized by three-dimensional crosslinking, thereby forming a first liquid crystal layer (thickness 2 μm). By the measurement made by using a spectrophotometer, it was confirmed that the center wavelength of the selective reflection wave range of the first liquid crystal layer was approximately 600 nm.

Further, the surface of the polymerized first liquid crystal layer was rubbed in the same direction as that of the director on this surface. The direction of the director on the first liquid crystal layer can be known by calculation from the direction in which the alignment layer has been rubbed, and the selective reflection wavelength, refractive index and thickness of the cholesteric liquid crystal, or by optical measurement. It can also be known by observing the cross section of the liquid crystal layer by a transmission electron microscope.

The first liquid crystal layer that had been rubbed was spin-coated, at a number of revolutions greater than before, with the same toluene solution as the above-described one except that the amount of the chiral agent was 15 parts.

The toluene contained in the toluene solution applied was then evaporated at 80° C. to form a coating film on the first liquid crystal layer. It was visually confirmed by way of selective reflection of light that this coating film was cholesteric. By the measurement made by using a spectrophotometer, it was confirmed that the center wavelength of the selective reflection wave range of this coating film was approximately 500 nm.

Ultraviolet light was applied to the above coating film to cause the photopolymerization initiator contained in the coating film to generate radicals, by which the acrylates in the monomer molecules were polymerized by three-dimensional crosslinking, thereby forming a second liquid crystal layer (thickness 1.5 μm). A multi-layered circularly-polarized-light-extracting optical element was thus produced.

The cross section of this multi-layered circularly-polarized-light-extracting optical element was observed by a transmission electron microscope. As a result, it was found the following: the bright and dark stripes that appeared between the polymerized liquid crystal layers were parallel to each other (from this, it can be known that the directions of the helical axes of the liquid crystalline molecules in the liquid crystal layers are the same); and no discontinuity was present between the liquid crystal layers (from this, it can be known that the directors in planes in the vicinity of the two neighboring liquid crystal layers coincide with each other). In the measurement made by using a spectrophotometer, no optical singularity was observed in the transmittance.

Comparative Example 2-1

In Comparative Example 2-1, a plurality of liquid crystal layers were made from a polymerizable monomer, where the directors in planes in the vicinity of the interface of each two neighboring liquid crystal layers were made different from each other by rubbing process. Namely, the procedure of Example 2-1 was repeated, provided that the surface of the polymerized coating film was rubbed in the direction perpendicular to the director on the coating film.

The cross section of the multi-layered circularly-polarized-light-extracting optical element thus obtained was observed by a transmission electron microscope. As a result, it was found the following: the bright and dark stripes that appeared between the liquid crystal layers were parallel to each other (from this, it can be known that the directions of the helical axes of the liquid crystalline molecules in the liquid crystal layers are the same), but discontinuity was present between the liquid crystal layers (from this, it can be known that the directors in planes in the vicinity of the interface of the two neighboring liquid crystal layers do not coincide with each other). In the measurement made by using a spectrophotometer, optical singularity was observed in the transmittance. From the detailed observation, the state of circular polarization was found disordered.

Example 2-2

In Example 2-2, a plurality of liquid crystal layers were made from a polymerizable monomer, where the liquid crystal layers were directly laminated so that the directors in planes in the vicinity of the interface of each two neighboring liquid crystal layers would coincide with each other.

The procedure of Example 2-1 was repeated, provided that the surface of the polymerized coating film was not rubbed.

The cross section of the multi-layered circularly-polarized-light-extracting optical element thus obtained was observed by a transmission electron microscope. As a result, it was found the following: the bright and dark stripes that appeared between the polymerized liquid crystal layers were parallel to each other (from this, it can be known that the directions of the helical axes of the liquid crystalline molecules in the liquid crystal layers are the same); and no discontinuity was present between the liquid crystal layers (from this, it can be known that the directors in planes in the vicinity of the interface of the two neighboring liquid crystal layers coincide with each other). In the measurement made by using a spectrophotometer, no optical singularity was observed in the transmittance.

Example 2-3

In Example 2-3, a plurality of liquid crystal layers were made from liquid crystalline polymers, where the liquid crystal layers were directly laminated so that the directors in planes in the vicinity of the interface of each two neighboring liquid crystal layers would coincide with each other.

A toluene solution was prepared by dissolving, in toluene, a liquid crystalline polymer containing acrylic side chains, having a glass transition temperature of 80° C. and an isotropic transition temperature of 200° C. (With respect to the polymeric cholesteric liquid crystal thus obtained, it was confirmed that the liquid crystalline molecules would be oriented on an alignment layer in one direction that was the direction, in which the alignment layer had been rubbed, ±5 degrees.)

Separately, a transparent glass substrate was spin-coated with polyimide dissolved in a solvent. After drying, a film of the polyimide was formed at 200° C. (film thickness 0.1 μm) and was rubbed in a definite direction so that this film would function as an alignment layer.

The glass substrate provided with this alignment layer was set in a spin-coater; and the alignment layer was spin-coated with the above-prepared toluene solution.

The toluene contained in the toluene solution applied was then evaporated at 90° C. to form, on the alignment layer, a coating film, which was held at 150° C. for 10 minutes. It was visually confirmed by way of selective reflection of light that this coating film was cholesteric. The coating film was cooled to room temperature to transform the liquid crystalline polymer into the glassy state and to fix the liquid crystalline polymer in this state, thereby forming a first liquid crystal layer (thickness 2 μm). By the measurement made by using a spectrophotometer, it was confirmed that the center wavelength of the selective reflection wave range of the first liquid crystal layer was approximately 600 nm.

Further, the first liquid crystal layer in the glassy state was spin-coated, at a number of revolutions greater than before, with a toluene solution prepared by dissolving, in toluene, a liquid crystalline polymer containing acrylic side chains, having a glass transition temperature of 75° C. and an isotropic transition temperature of 190° C.

Next, the toluene contained in the toluene solution applied was evaporated at 80° C. to form a coating film on the first liquid crystal layer. It was visually confirmed by way of selective reflection of light that this coating film was cholesteric. By the measurement made by using a spectrophotometer, it was confirmed that the center wavelength of the selective reflection wave range of the coating film was approximately 500 nm.

Thereafter, the toluene contained in the toluene solution applied was evaporated at 90° C.; and the coating film was held at 150° C. for 10 minutes. It was visually confirmed by way of selective reflection of light that this coating film was cholesteric. The coating film was cooled to room temperature to transform the liquid crystalline polymer into the glassy state and to fix the liquid crystalline polymer in this sate, thereby forming a second liquid crystal layer (thickness 1.5 μm). A multi-layered circularly-polarized-light-extracting optical element was thus obtained.

The cross section of this multi-layered circularly-polarized-light-extracting optical element was observed by a transmission electron microscope. As a result, it was found the following: the bright and dark stripes that appeared between the solidified liquid crystal layers were parallel to each other (from this, it can be known that the directions of the helical axes of the liquid crystalline molecules in the liquid crystal layers are the same); and no discontinuity was present between the liquid crystal layers (from this, it can be known that the directors in planes in the vicinity of the interface of the two neighboring liquid crystal layers coincide with each other). In the measurement made by using a spectrophotometer, no optical singularity was observed in the transmittance.

Example 2-4

In Example 2-4, a transition liquid crystal layer was provided between two neighboring liquid crystal layers of multiple liquid crystal layers made from a polymerizable monomer.

90 parts of a monomer containing, in its molecule, polymerizable acrylates at both ends and spacers between mesogen existing at the center and the acrylates, having a nematic-isotropic transition temperature of 110° C., and 10 parts of a chiral gent having, in its molecule, polymerizable acrylates at both ends were dissolved in toluene. To this toluene solution was added a photopolymerization initiator in an amount of 3% by weight of the above monomer. (With respect to the chiral nematic liquid crystal thus obtained, it was confirmed that the liquid crystalline molecules would be oriented on an alignment layer in one direction that was the direction, in which the alignment layer had been rubbed, ±5 degrees.)

Separately, a transparent glass substrate was spin-coated with polyimide dissolved in a solvent. After drying, a film of the polyimide was formed at 200° C. (film thickness 0.1 μm) and was rubbed in a definite direction so that this film would function as an alignment layer.

The glass substrate provided with this alignment layer was set in a spin-coater; and the alignment layer was spin-coated with the above-prepared toluene solution.

The toluene contained in the toluene solution applied was then evaporated at 80° C. to form a coating film on the alignment layer. It was visually confirmed by way of selective reflection of light that this coating film was cholesteric.

Ultraviolet light was applied to the above coating film in an amount of 1/10 of that of ultraviolet light applied in Example 2-1 to cause the photopolymerization initiator contained in the coating film to generate radicals, by which the acrylates in the monomer molecules were polymerized by three-dimensional crosslinking, thereby forming a first liquid crystal layer (thickness 2 μm). By the measurement made by using a spectrophotometer, it was confirmed that the center wavelength of the selective reflection wave range of the first liquid crystal layer was approximately 600 nm.

Further, the polymerized first liquid crystal layer was spin-coated, at a number of revolutions greater than before, with the same toluene solution as the above-described one except that the amount of the chiral agent was 15 parts.

Next, the toluene contained in the toluene solution was evaporated at 80° C. to form a coating film on the first liquid crystal layer. It was visually confirmed by way of selective reflection of light that this coating film was cholesteric. By the measurement made by using a spectrophotometer, it was confirmed that the center wavelength of the selective reflection wave range of this coating film was approximately 500 nm.

Ultraviolet light was applied to the above coating film to cause the photopolymerization initiator contained in the coating film to generate radicals, by which the acrylates in the monomer molecules were polymerized by three-dimensional crosslinking, thereby forming a second liquid crystal layer (thickness 1.5 μm). A multi-layered circularly-polarized-light-extracting optical element was thus obtained.

The cross section of this multi-layered circularly-polarized-light-extracting optical element was observed by a transmission electron microscope. As a result, it was found the following: the bright and dark stripes that appeared between the polymerized liquid crystal layers were parallel to each other (from this, it can be known that the directions of the helical axes of the liquid crystalline molecules in the liquid crystal layers are the same); and no discontinuity was present between the liquid crystal layers (from this, it can be known that the directors in planes in the vicinity of the two neighboring liquid crystal layers coincide with each other). In the measurement made by using a spectrophotometer, no optical singularity was observed in the transmittance.

It was also confirmed that a transition layer was present between the two liquid crystal layers. The pitch of the bright and dark stripes originating from this transition layer was equal to that of the bright and dark stripes originating from the liquid crystal layers between which the transition layer was present.

The reason why the transition layer was created seems to be as follows: since the photopolymerization initiator was added in a decreased amount and ultraviolet light was applied also in a decreased amount, the first liquid crystal layer was not fully three-dimensionally cross-linked, and the components of the first liquid crystal layer were partially transferred to the second liquid crystal layer.

What is claimed is:

1. A circularly-polarized-light-extracting optical element comprising a liquid crystal layer having cholesteric regularity with liquid crystalline molecules in planar orientation, wherein the liquid crystalline molecules located on one of the two main opposite surfaces of the liquid crystal layer are wholly oriented in substantially one direction so as to have a specific director in a plane of one main surface, and the liquid crystalline molecules located on the other main surface of the liquid crystal layer are also wholly oriented in substantially one direction so as to have a specific director in a plane of the other main surface.

2. The circularly-polarized-light-extracting optical element according to claim 1, wherein the director on one of the two main opposite surfaces of the liquid crystal layer is substantially parallel to that on the other main surface of the liquid crystal layer.

3. The circularly-polarized-light-extracting optical element according to claim 2, wherein a helical structure consisting of liquid crystalline molecules with helical turns in a number of (0.5×integer) is present between the liquid crystalline molecules existing on the two main opposite surfaces of the liquid crystal layer.

4. A polarized light source device comprising:
   a light source; and
   a circularly-polarized-light-extracting optical element according to claim 1, which receives light emitted from the light source and transmit polarized light.

5. A liquid crystal display comprising:
   a polarized light source device according to claim 4; and
   a liquid crystal cell that receives polarized light emitted from the polarized light source device and transmits the polarized light while changing a transmittance for it.

6. A circularly-polarized-light-extracting optical element comprising a plurality of liquid crystal layers having cholesteric regularity with liquid crystalline molecules in planar orientation, the liquid crystal layers being successively and directly laminated, wherein the liquid crystalline molecules located on one of the two main opposite outermost surface of the liquid crystal layers laminated are wholly oriented in substantially one direction so as to have a specific director in a plane of one main surface, and the liquid crystalline molecules located on the other main outermost surface of the laminated liquid crystal layers are also wholly oriented in substantially one direction so as to have a specific director in a plane of the other main surface.

7. The circularly-polarized-light-extracting optical element according to claim 6, wherein the director on one of the two main opposite outermost surfaces of the liquid crystal layers laminated is substantially parallel to that on the other main outermost surface of the liquid crystal layers laminated.

8. The circularly-polarized-light-extracting optical element according to claim 7, wherein a helical structure consisting of liquid crystalline molecules with helical turns in a number of (0.5×integer) is present between the liquid crystalline molecule existing on the two main outermost surfaces of the liquid crystal layers laminated.

9. The circularly-polarized-light-extracting optical element according to claim 6, wherein the directors in planes in a vicinity of an interface of each two neighboring liquid crystal layers of the multiple liquid crystal layers are substantially parallel to each other.

10. A process of producing a circularly-polarized-light-extracting optical element comprising the steps of:
   coating an alignment layer whose entire surface has been treated so that its alignment-regulating action will act in substantially one direction, with liquid crystalline molecules comprising polymerizable monomer or oligomer molecules having cholesteric regularity, so as to align the liquid crystalline molecules by the alignment-regulating action of the alignment layer;
   three-dimensionally crosslinking the liquid crystalline molecules that have been aligned by the alignment-regulating action of the alignment layer, thereby forming a first liquid crystal layer;

directly coating the first liquid crystal layer with another liquid crystalline molecules comprising polymerizable monomer or oligomer molecules having cholesteric regularity, so as to align the liquid crystalline molecules by the alignment-regulating action of the surface of the first liquid crystal layer that has been three-dimensionally crosslinked; and three-dimensionally crosslinking the liquid crystalline molecules that have been aligned by the alignment-regulating action of the surface of the three-dimensionally crosslinked first liquid crystal layer, thereby forming a second liquid crystal layer.

11. The process of producing a circularly-polarized-light-extraction optical element according to claim 10, wherein a thickness of the first liquid crystal layer and that of the second liquid crystal layer are adjusted so that the directors on the two main opposite surfaces of the first liquid crystal layer will be substantially parallel to each other and that the directors on the two main opposite surfaces of the second liquid crystal layer will be substantially parallel to each other.

12. Then process of producing a circularly-polarized-light-extracting optical element according to claim 10, wherein, in the step of coating the alignment layer with the liquid crystalline molecules and aligning the liquid crystalline molecules to form the first liquid crystal layer, the alignment of the liquid crystalline molecules on the surface of the first liquid crystal layer is regulated by applying another alignment layer to the surface of the first liquid crystal layer at the opposite of the firstly provided alignment layer.

13. A process of producing a circularly-polarized-light-extracting optical element comprising the steps of:

coating an alignment layer whose entire surface has been treated so that its alignment-regulating action will act in substantially one direction, with a liquid crystalline polymer having cholesteric regularity, so as to align the liquid crystalline polymer by the alignment-regulating action of the alignment layer;

cooling the liquid crystalline polymer that has been aligned by the alignment-regulating action of the alignment layer to transform it into the glassy state, thereby forming a first liquid crystal layer;

directly coating the first liquid crystal layer with another liquid crystalline polymer having cholesteric regularity, so as to align the liquid crystalline polymer by the alignment-regulating action of the surface of the first liquid crystal layer that has been transformed into the glassy state; and cooling the liquid crystalline polymer that has been aligned by the alignment-regulating action of the surface of the first liquid crystal layer in the glassy state to transform it into the glassy state, thereby forming a second liquid crystal layer.

14. The process of producing a circularly-polarized-light-extracting optical element according to claim 13, wherein a thickness of the first liquid crystal layer and that of the second liquid crystal layer are adjusted sothat the directors on the two main opposite surface of the first liquid crystal layer will be substantially parallel to each other and that the directors on the two main opposite surfaces of the second liquid crystal layer will be substantially parallel to each other.

15. The process of producing a circularly-polarized-light-extracting optical element according to claim 13, wherein, in the step of coating the alignment layer with the liquid crystalline polymer and aligning the liquid crystalline polymer to form the first liquid crystal layer, the alignment of the liquid crystalline polymer on the surface of the first liquid crystal layer is regulated by applying another alignment layer to the surface of the first liquid crystal layer at the opposite of the firstly provided alignment layer.

16. A circularly-polarized-light-extracting optical element comprising a plurality of liquid crystal layers having cholesteric regularity, wherein the liquid crystal layers are laminated so that helical axes of liquid crystalline molecules will point in substantially one direction and that directors in planes in a vicinity of an interface of each two neighboring liquid crystal layers of the multiple liquid crystal layers will substantially coincide with each other.

17. The circularly-polarized-light-extracting optical element according to claim 16, wherein each liquid crystal layer comprises polymerizable monomer or oligomer molecules that have been three-dimensionally crosslinked.

18. The circularly-polarized-light-extracting optical element according to claim 16, wherein each liquid crystal layer comprises a liquid crystalline polymer.

19. The circularly-polarized-light-extracting optical element according to claim 16, wherein at least one of the multiple liquid crystal layers has a pitch of a molecular helix in a helical structure consisting of liquid crystalline molecules, different from that of a molecular helix in a helical structure in the other liquid crystal layers.

20. The circularly-polarized-light-extracting optical element according to claim 16, wherein a thickness of each liquid crystal layer is smaller than a thickness required for the liquid crystal layer to reflect, with a maximum reflectance, either right-handed or left-handed circularly polarized component of light having a specific wavelength, contained in incident light.

21. The circularly-polarized-light-extracting optical element according to claim 16, wherein the directions of rotation of the liquid crystalline molecules in the respective liquid crystal layers are the same.

22. The circularly-polarized-light-extracting optical element according to claim 21, wherein at least two of the multiple liquid crystal layers have selective reflection wave ranges whose center regions do not agree with each other and whose end regions are partially overlapped.

23. A polarized light source device comprising:
a light source; and
a circularly-polarized-light-extracting optical element according to claim 16, which receives light emitted from the light source and transmits polarized light.

24. A liquid crystal display comprising:
a polarized light source device according to claim 23; and
a liquid crystal cell that receives polarized light emitted from the polarized light source device and transmits the polarized light while changing a transmittance for it.

25. A circularly-polarized-light-extracting optical element comprising:
a plurality of liquid crystal layers having cholesteric regularity;
and a transition liquid crystal layer provided between at least any two neighboring liquid crystal layers of the multiple liquid crystal layers, in which a pitch of a molecular helix in a helical structure consisting of liquid crystalline molecules varies in a direction of thickness,
wherein the liquid crystal layers are laminated so that helical axes of liquid crystalline molecules in the respective liquid crystal layers will point in substantially one direction; directors in planes in a vicinity of an interface of each two neighboring liquid crystal layers of the multiple liquid crystal layers substantially coincide with each other; a pitch of a molecular helix in one of the two liquid crystal layers between which the transition liquid crystal layer is provided is different from that of a molecular helix in the other liquid crystal layer; and the pitch of the molecular helix on one surface of the transition liquid crystal layer is substantially equal to that of the molecular helix in the liquid crystal layer which is in contact with one surface of the transition liquid crystal layer, while the pitch of the molecular helix on the other surface of the transition liquid crystal layer is substantially equal to that of the molecular helix in the other liquid crystal layer which is in contact with the other surface of the transition liquid crystal layer.

26. A process of producing a circularly-polarized-light-extracting optical element comprising the steps of:

coating an alignment layer with liquid crystalline molecule comprising polymerizable monomer or oligomer molecules having cholesteric regularity, so as to align the liquid crystalline molecules by the alignment-regulating action of the alignment layer;

three-dimensionally crosslinking the liquid crystalline molecules that have been aligned by the alignment-regulating action of the alignment layer, thereby forming a first liquid crystal layer;

directly coating the first liquid crystal layer with another liquid crystalline molecules comprising polymerizable monomer or oligomer molecules having cholesteric regularity, so as to align the liquid crystalline molecules by the alignment-regulating action of the surface of the first liquid crystal layer that has been three-dimensionally crosslinked; and three-dimensionally crosslinking the liquid crystalline molecules that have been aligned by the alignment-regulating action of the surface of the three-dimensionally crosslinked first liquid crystal layer, thereby forming a second liquid crystal layer.

27. A process of producing a circularly-polarized-light-extracting optical element comprising the steps of:

coating an alignment layer with a liquid crystalline polymer having cholesteric regularity, so as to align the liquid crystalline polymer by the alignment-regulating action of the alignment layer;

cooling the liquid crystalline polymer that has been aligned by the alignment-regulating action of the alignment layer to transform it into the glassy state, thereby forming a first liquid crystal layer;

directly coating the first liquid crystal layer with another liquid crystalline polymer having cholesteric regularity, so as to align the liquid crystalline polymer by the alignment-regulating action of the surface of the first liquid crystal layer that has been transformed into the glassy state; and cooling the liquid crystalline polymer that has been aligned by the alignment-regulating action of the surface of the first liquid crystal layer in the glassy state to transform it into the glassy state, thereby forming a second liquid crystal layer.

* * * * *